(12) United States Patent
Ishida et al.

(10) Patent No.: US 9,487,139 B1
(45) Date of Patent: Nov. 8, 2016

(54) DETERMINING A DRIVER ALERT LEVEL FOR A VEHICLE ALERT SYSTEM AND METHOD OF USE

(71) Applicant: Honda Motor Co., Ltd., Tokyo (JP)

(72) Inventors: Takahisa Ishida, Dublin, OH (US); Justin Yerkes, Maryville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/712,948

(22) Filed: May 15, 2015

(51) Int. Cl.
*G08B 21/00* (2006.01)
*B60Q 9/00* (2006.01)
*B60R 21/013* (2006.01)

(52) U.S. Cl.
CPC ............. *B60Q 9/008* (2013.01); *B60R 21/013* (2013.01)

(58) Field of Classification Search
CPC ....................................................... B60Q 9/008
USPC ...................... 340/435, 436, 903; 701/1, 301
See application file for complete search history.

(56) References Cited

U.S. PATENT DOCUMENTS

2007/0021876 A1* 1/2007 Isaji ..................... B60K 28/066
701/1

* cited by examiner

*Primary Examiner* — Jeffery Hofsass
(74) *Attorney, Agent, or Firm* — Rankin, Hill & Clark LLP

(57) ABSTRACT

A driver alert system for a vehicle and a method for operating the driver alert system are disclosed. The driver alert system for the vehicle includes an alert system triggering event detection module for detecting a driver alert system triggering event. The alert system triggering event detection module includes at least one of a steering event detection module for detecting a steering event, a blind spot detection module for detecting a blind spot event, and a front collision warning event detection module for detecting a front collision warning event. The driver alert system for the vehicle includes a driver alert level determination module for determining a driver alert level for the driver alert system triggering event. The driver alert system also includes a driver alert module for alerting the driver of the vehicle using a driver alert device based on the driver alert.

14 Claims, 14 Drawing Sheets

US 9,487,139 B1

DETERMINING A DRIVER ALERT LEVEL FOR A VEHICLE ALERT SYSTEM AND METHOD OF USE

BACKGROUND

A collision between a vehicle and an obstacle in the blind spot of the vehicle is a common type of traffic accident that can be caused by the driver of the vehicle being unaware of the presence of the obstacle. Further, a collision between the vehicle and an obstacle, when the obstacle is in the process of overtaking the vehicle, is another common type of traffic accident that can be caused by the driver of the vehicle being unaware of the presence of the obstacle. Additionally, a collision between the vehicle and an obstacle in front of the vehicle is another common type of traffic accident that can be caused by the driver of the vehicle being unaware of the presence of the obstacle.

BRIEF DESCRIPTION

According to one aspect, a method for operating a driver alert system for a vehicle includes detecting a driver alert system triggering event, wherein the driver alert system triggering event is at least one of a steering event, a blind spot event, and a front collision warning event; determining a driver alert level for the driver alert system triggering event; and alerting a driver of the vehicle using a driver alert device based on the driver alert level.

According to another aspect, a non-transitory computer-readable storage medium storing executable code for a driver alert system for a vehicle is provided. The code, when executed by a processor, performs actions including detecting a driver alert system triggering event, wherein the driver alert system triggering event is at least one of a steering event, a blind spot event, and a front collision warning event. The actions further include determining a driver alert level for the driver alert system triggering event, and alerting a driver of the vehicle using a driver alert device based on the driver alert level.

According to yet another aspect, a driver alert system for the vehicle, includes an alert system triggering event detection module for detecting a driver alert system triggering event using at least one of a steering input sensor, a camera, and a radar unit. The alert system triggering event detection module includes at least one of a steering event detection module for detecting a steering event, a blind spot detection module for detecting a blind spot event, and a front collision warning event detection module for detecting a front collision warning event. The driver alert system for the vehicle includes a driver alert level determination module for determining a driver alert level for the driver alert system triggering event. The driver alert system for the vehicle also includes a driver alert module for alerting the driver of the vehicle using a driver alert device based on the driver alert level determined by the driver alert level determination module, wherein the driver alert module changes a mode of a display based on the driver alert level.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
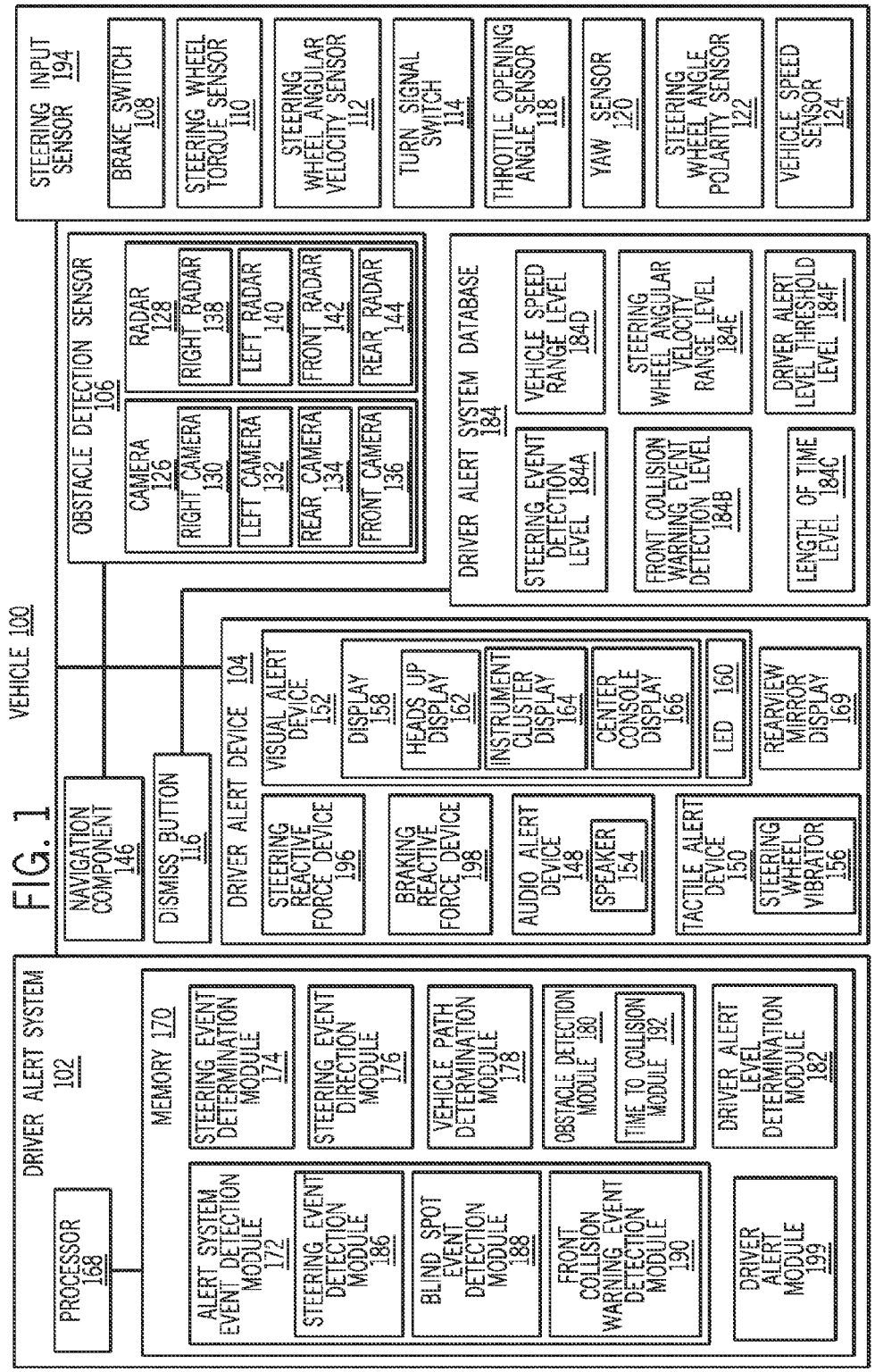
FIG. 1 is a block diagram of a vehicle having a driver alert system in accordance with an exemplary embodiment.

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

A "database", as used herein can refer to table, a set of tables, or a set of data stores and/or methods for accessing and/or manipulating those data stores.

A "vehicle", as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). Additionally, the term "vehicle" can refer to an autonomous vehicle and/or self-driving vehicle powered by any form of energy. The autonomous vehicle may or may not carry one or more human occupants.

As used herein, an occupant of a vehicle may include a driver of a vehicle, an operator of a vehicle, an individual, an entity, a person, a passenger, etc. As used herein, a driver of a vehicle may be an operator of a vehicle or an occupant who provides one or more vehicle operations or commands to the vehicle, such as steering commands, for example. As used herein, an obstacle may include an object, a potential obstacle, a hazard, a potential hazard, other vehicles, a person, a pedestrian, an animal, a pothole, road kill, physical objects, other types of vehicle, such as a bicycle, a human, stationary objects, moving objects, etc.

As used herein, a notification may include an alert which may be presented or rendered in a variety of formats, such as an audio alert, a graphic element, a video, an animation, a tactile response, a vibratory alert, modification of one or more vehicle systems or vehicle components, etc. In other words, a notification may include one or more adjustments, compensation, responses, or reactions to one or more objects. For example, visual devices, audio devices, tactile devices, antilock brake systems, brake assist systems, cruise control systems, stability control systems, collision warning systems, lane keep assist systems, blind spot indicator systems, pre-tensioning systems, climate control systems, etc. may be adjusted or controlled to implement a notification. Regardless, a notification may provide a stimulus for one or more senses of an occupant of a vehicle.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless otherwise indicated, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus can be specially constructed for the purposes, e.g., a specific computer, or it can include a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the subject matter of the disclosure. Accordingly, the disclosure of the embodiments is intended to be illustrative, but not limiting, of the scope of the embodiments, which is set forth in the claims.

Referring now to the drawings, wherein the showings are for purposes of illustrating one or more exemplary embodiments and not for purposes of limiting the same, FIG. 1 is a block diagram of a vehicle 100 having a driver alert system 102 in accordance with an exemplary embodiment. The vehicle 100 can include the driver alert system 102, which includes at least one driver alert device 104, at least one obstacle detection sensor 106, a driver alert system database 184, a memory 170, a processor 168, a navigation component 146, and at least one steering input sensor 194. In one or more embodiments, the vehicle 100 can include components other than those illustrated in FIG. 1.

The steering input sensor 194 can measure properties of the inputs applied to the steering wheel by the driver. The steering input sensor 194 can include at least one of a steering wheel torque sensor 110, a steering wheel angular velocity sensor 112, the brake switch 108, the turn signal switch 114, the throttle opening angle sensor 118, the yaw sensor 120, the steering wheel angle polarity sensor 122, and the vehicle speed sensor 124. The brake switch 108 can detect the actuation of the brakes of the vehicle 100 by the driver. The steering wheel torque sensor 110 can measure the torque applied to the steering wheel of the vehicle 100. The steering wheel angular velocity sensor 112 can measure the angular velocity of the steering wheel of the vehicle 100. The turn signal switch 114 can determine an intent of the driver to change the lane of travel of the vehicle 100 or turn the vehicle 100. The turn signal switch 114 can also determine a direction of the intended lane change or turn of the vehicle 100.

The throttle opening angle sensor 118 can measure the angle of the throttle opening of the vehicle 100. In one embodiment, the throttle opening angle sensor 118 can provide an indication as to whether the driver of the vehicle 100 is throttling up or throttling down. The yaw sensor 120 can measure the yaw of the vehicle 100. The steering wheel angle polarity sensor 122 can measure a polarity of the rotation of the steering wheel of the vehicle 100. In one embodiment, the steering wheel angle polarity sensor 122 can indicate the direction of a turn or lane change of the vehicle 100. The vehicle speed sensor 124 can measure the speed of the vehicle 100. The steering wheel can be used by the driver to navigate the vehicle 100. For example, the steering wheel can be used by the driver of the vehicle 100 to maintain a current lane of travel of the vehicle 100, to change the lane of travel of the vehicle 100, or to execute a turn of the vehicle 100.

The dismiss button 116 can dismiss or silence an alert provided to the driver by the driver alert device 104. For example, the dismiss button 116 can be used to prevent displays 158 from appearing for low level alerts that some drivers of the vehicle 100 may find annoying, while still allowing high level alerts to appear. The dismiss button 116 may be implemented as a hardware button or as a 'soft' button. For example, the dismiss button 116 may be a hardware switch on a turn signal switch 114 or other turn signal apparatus. Alternatively, the dismiss button 116 may be a soft button presented in a user interface (UI) rendered by the display 158.

The obstacle detection sensor 106 can determine the presence of an obstacle in an alert zone of the vehicle 100. For example, the obstacle detection sensor 106 can be at least one of a camera 126 or a radar unit 128. The camera 126 can be a still picture camera or a video camera. As used herein, 'camera' may include an image capture device and may include digital cameras which use electronic image sensors. The camera 126 can be at least one of a right camera 130 for detecting obstacles on the right side of the vehicle 100, a left camera 132 for detecting obstacles on the left side of the vehicle 100, a front camera 136 for detecting obstacles in front of the vehicle 100, and a rear camera 134 for detecting obstacles behind the vehicle 100. The radar unit 128 can include at least one of a short range radar unit, a medium range radar unit, and a long range radar unit. The radar unit 128 can include at least one of a right radar unit 138 for detecting obstacles on the right side of the vehicle 100, a left radar unit 140 for detecting obstacles on the left side of the vehicle 100, a front radar unit 142 for detecting obstacles in front of the vehicle 100, and a rear radar unit 144 for detecting obstacles behind the vehicle 100. The obstacle can include any object that can inflict damage upon the vehicle 100, or can be damaged by the vehicle 100. Examples of objects may include pedestrians, obstructions, potholes, etc.

The driver alert device 104 can alert the driver of the vehicle 100 to the presence of an obstacle. The driver alert device 104 can include at least one of an audio alert device 148, a tactile alert device 150, a visual alert device 152, a steering reactive force device 196, and a braking reactive force device 198. The audio alert device 148 can provide an audio alert to the driver of the vehicle 100 regarding the presence of an obstacle. In one embodiment, the audio alert device 148 can be at least one speaker 154. The tactile alert device 150 can provide a tactile alert to the driver of the vehicle 100 regarding the presence of an obstacle. In one embodiment, the tactile alert device 150 can be a steering wheel vibrator 156.

The visual alert device 152 can provide a visual alert to the driver of the vehicle 100 regarding the presence of an obstacle. In one embodiment, the visual alert device can be one or more of at least one display 158 and at least one LED 160. The display 158 can be at least one of a heads up display 162, an instrument cluster display 164, and a center console display 166. Further, the display 158 may include a display mirror, such as a rear view mirror display 169 of a vehicle which is equipped or configured to present or render video output from one or more of the cameras 126 or other visual outputs, such as icons or other indicators.

In one or more embodiments, the steering reactive force device 196 may provide automatic steering in response to an obstacle detected by the obstacle detection sensor 106. Similarly, the braking reactive force device 198 may provide automatic braking in response to an obstacle detected by the obstacle detection sensor 106. The processor 168, the memory 170, driver alert module 199, etc. may determine the position of the obstacle and implement a corresponding driver alert device 104 accordingly. In other words, if the obstacle is detected in front of the vehicle 100, and the vehicle 100 is approaching the obstacle in a high driver alert level (as will be described in greater detail herein), the driver alert module 199 may have the braking reactive force device 198 apply the brakes, decrease velocity, or decelerate the vehicle 100 accordingly in a manner to mitigate damage or collision with the obstacle.

In one exemplary embodiment, one or more LEDs 160 can be placed throughout the vehicle 100 and can illuminate when an object is approaching an area of the vehicle 100 where the illuminated LED 160 is located. Further, one or more LEDs 160 can be present in the vehicle. Each LED 160 can represent a different area of the vehicle 100, such that the illumination of an LED 160 can indicate that an object is approaching a corresponding area of the vehicle 100 represented by the illuminated LED 160. The steering reactive force device 196 can provide at least one of steering assistance to the driver or automated steering of the vehicle 100 in an effort to avoid or reduce the impact of a collision between the vehicle 100 and the obstacle. The braking reactive force device 198 can provide at least one of braking assistance to the driver or automated steering of the vehicle 100 in an effort to avoid or reduce the impact of a collision between the vehicle 100 and the obstacle.

The driver alert system 102 includes a processor 168 and memory 170. The driver alert system 102 includes features, such as communication interfaces to the driver alert device 104, the obstacle detection sensor 106, the brake switch 108, the steering wheel torque sensor 110, the steering wheel angular velocity sensor 112, the turn signal switch 114, the dismiss button 116, the throttle opening angle sensor 118, the yaw sensor 120, the steering wheel angle polarity sensor 122, the vehicle speed sensor 124, the steering wheel, the audio alert device 148, the speaker 154, the tactile alert device 150, the steering wheel vibrator 156, the visual alert device 152, the LED 160, the display 158, the heads up display 162, the instrument cluster display 164, the center console display 166, the camera 126, the right camera 130, the left camera 132, the rear camera 134, the front camera 136, the radar unit 128, the right radar unit 138, the left radar unit 140, the front radar unit 142, the rear radar unit 144, the steering reactive force device 196, and the braking reactive force device 198. In other exemplary embodiments, the driver alert system 102 can also include additional features other than those illustrated in FIG. 1.

In one exemplary embodiment, the processor 168 processes data signals and can include various computing architectures including, but not limited to, a complex instruction set computer (CISC) architecture, a reduced instruction set computer (RISC) architecture, or an architecture implementing a combination of instruction sets. Although only a single processor 168 is shown in FIG. 1, multiple processors can be included. The processor 168 can include an arithmetic logic device, a microprocessor, or some other information appliance equipped to transmit, receive, and process non-transitory electronic data signals from the memory 170, the driver alert device 104, the obstacle detection sensor 106, the brake switch 108, the steering input sensor 194, the steering wheel torque sensor 110, the steering wheel angular velocity sensor 112, the turn signal switch 114, the dismiss button 116, the throttle opening angle sensor 118, the yaw sensor 120, the steering wheel angle polarity sensor 122, the vehicle speed sensor 124, the steering wheel, the audio alert device 148, the speaker 154, the tactile alert device 150, the steering wheel vibrator 156, the visual alert device 152, the LED 160, the display 158, the heads up display 162, the instrument cluster display 164, the center console display 166, the camera 126, the right camera 130, the left camera 132, the rear camera 134, the front camera 136, the radar unit 128, the right radar unit 138, the left radar unit 140, the front radar unit 142, the rear radar unit 144, the steering reactive force device 196, and the braking reactive force device 198.

In one exemplary embodiment, the memory 170 stores instructions and/or data that can be executed by the processor 168. The instructions and/or data can include code (e.g. modules and/or databases) for performing all of the techniques described herein. In one exemplary embodiment, the memory 170 includes an alert system event detection module 172, a steering event determination module 174, a steering event direction module 176, a vehicle path determination module 178, an obstacle detection module 180, a driver alert level determination module 182, a driver alert system database 184, a steering event detection level 184A, a front collision warning event detection level 1848, a length of time level 184C, a vehicle speed range level 184D, a steering wheel angular velocity range level 184E, a driver alert level threshold level 184F, a steering event detection module 186, a blind spot event detection module 188, a front collision warning event detection module 190, a time to collision module 192, and a driver alert module 199.

In other exemplary embodiments, other modules and databases than those shown in FIG. 1 can be used to perform the functionality described herein. For example, one or more of the steering event detection level 184A, the front collision warning event detection level 1848, the length of time level 184C, the vehicle speed range level 184D, the steering wheel angular velocity range level 184E, and the driver alert level threshold level 184F can be included in a database other than the driver alert system database 184 of the driver alert system 102. In one exemplary embodiment, driver alert system database 184 can be hosted locally, such as in the memory 170 of the driver alert system 102. In other exemplary embodiments, driver alert system database 184 can be hosted remotely from the driver alert system 102 and/or tied to another application.

The modules and databases of the driver alert system 102 are adapted to communicate, via a bus (not shown), with the processor 168, the driver alert device 104, the obstacle detection sensor 106, the brake switch 108, the steering input sensor 194, the steering wheel torque sensor 110, the steering wheel angular velocity sensor 112, the turn signal switch 114, the dismiss button 116, the throttle opening angle sensor 118, the yaw sensor 120, the steering wheel angle polarity sensor 122, the vehicle speed sensor 124, the steering wheel, the audio alert device 148, the speaker 154, the tactile alert device 150, the steering wheel vibrator 156, the visual alert device 152, the LED 160, the display 158, the heads up display 162, the instrument cluster display 164, the center console display 166, the camera 126, the right camera 130, the left camera 132, the rear camera 134, the front camera 136, the radar unit 128, the right radar unit 138, the left radar unit 140, the front radar unit 142, the rear radar unit 144, the steering reactive force device 196, and the braking reactive force device 198.

The vehicle path determination module 178 can determine the path of the vehicle 100 using the output from at least one of the steering input sensor 194, the brake switch 108, the yaw sensor 120, the steering wheel angle polarity sensor 122, the vehicle speed sensor 124, the steering wheel torque sensor 110, and the steering wheel angular velocity sensor 112.

The obstacle detection module 180 can detect an obstacle in an alert zone of the vehicle 100. In one embodiment, the obstacle detection module 180 detects an obstacle in an alert zone of the vehicle 100 using the output of at least one of the obstacle detection sensors 106. For example, the obstacle detection module 180 can detect an obstacle in an alert zone of the vehicle 100 using the output of at least one of the camera 126 and the radar unit 128.

The alert system event detection module 172 can detect a driver alert system triggering event. In one embodiment, the driver alert system triggering event can be at least one of a steering event, a blind spot event, and a front collision warning event. The alert system event detection module 172 includes a steering event detection module 186 for detecting the steering event, a blind spot event detection module 188 for detecting the blind spot event, and the front collision warning event detection module 190 for detecting the front collision warning event.

The steering event detection module 186 can receive measurements of inputs made to the steering wheel by the driver from the steering input sensor 194. The steering event detection module 186 can then determine whether a steering event has occurred based on the measurements received from the steering input sensor 194. The steering input sensor 194 can be at least one of the steering wheel torque sensor 110 and the steering wheel angular velocity sensor 112. For example, the steering event detection module 186 can receive outputs of measurements for at least one of the torque applied to the steering wheel by the driver from the steering wheel torque sensor 110 and measurements of the angular velocity of the steering wheel from the steering wheel angular velocity sensor 112.

In one embodiment, the steering event detection module 186 determines that the steering event occurs, when the steering angular velocity measured by the steering wheel angular velocity sensor 112 outputted to the steering event detection module 186 is greater than or equal to a steering angular velocity steering event threshold, and the torque applied to the steering wheel of the vehicle measured by the steering wheel torque sensor 110 and outputted to the steering event detection module 186 is greater than or equal to a steering wheel torque steering event threshold. In one embodiment, the steering wheel angular velocity steering event threshold can be 10 deg/s and the steering wheel torque steering event threshold can be 1 Nm. In other embodiments, different values for the steering wheel angular velocity steering event threshold and the steering wheel torque steering event threshold may be utilized for determining when a steering event has occurred. The steering wheel torque steering event threshold and the steering wheel angular velocity steering event threshold can be stored in a steering event detection level 184A of the driver alert system database 184.

The blind spot event detection module 188 can detect the occurrence of the blind spot event based on the output of at least one of the obstacle detection module 180, the obstacle detection sensor 106, and the turn signal switch 114. For example, the blind spot event detection module 188 can detect that the blind spot event has occurred, when the output of at least one of the obstacle detection sensor 106 indicates that an obstacle is present in an alert zone of the vehicle 100 and the driver of the vehicle 100 uses the turn signal switch 114 to indicate the intent to navigate the vehicle 100 in the direction of the obstacle 216. In some embodiments, the steering event detection module 186 can use the obstacle detection module 180 to monitor the output of the obstacle detection sensor 106 to detect the presence of an obstacle in an alert zone of the vehicle 100. In other embodiments, the blind spot event detection module 188 may utilize steering information from the steering input sensor 194 in combination with the turn signal switch 114 to determine whether a blind spot event has occurred.

The obstacle detection module 180 has a time to collision module 192. The time to collision module 192 can determine a time to collision between the obstacle detected by the obstacle detection module 180 and the vehicle 100 using at least one of the output of the throttle opening angle sensor 118, the output of the brake switch 108, and the output of the vehicle path determination module 178. For example, the time to collision module 192 can determine a time to collision between the obstacle 216 and the vehicle 100 by determining a path of the obstacle 216, comparing the determined path of the obstacle 216 to the path of the vehicle 100 determined by the vehicle path determination module 178, and calculating the time at which the path of the vehicle 100 will cross the path of the obstacle 216 using the output of the throttle opening angle sensor 118 of the vehicle 100 and the output of the brake switch 108 of the vehicle 100.

As an example, the obstacle detection module 180 may estimate or calculate a projected path for the obstacle based on one or more aspects associated with the obstacle, such as velocity, acceleration, position, awareness (e.g., when the obstacle is or is associated with an individual, determining whether the individual is paying attention), etc. The obstacle detection module 180 may estimate or calculate the path of an obstacle by extrapolating based on the current path of the obstacle or based on contextual cues. For example, if the obstacle is a vehicle, and that vehicle has a left turn blinker activated, the obstacle detection module 180 may determine that the obstacle or vehicle will turn left relative to a front of the obstacle vehicle. However, the direction or path may be a different direction when viewed relative to the front of the vehicle 202, for example. In this way, the obstacle detection module 180 may determine an estimated path for the obstacle, which may be cross referenced with the path of the vehicle determined by the vehicle path determination module 178. The time to collision module 192 may determine whether or not the estimated path of the obstacle and the path of the vehicle intersect, nearly intersect (e.g., cross within a threshold time period), never intersect, or intersect after a threshold time period.

The steering event direction module 176 of the vehicle 100 can detect the direction the driver is steering the vehicle 100 using at least the output of the steering wheel angle polarity sensor 122. For example, the steering event direction module 176 can detect that the driver is steering the vehicle 100 to the right, when the output of the steering wheel angle polarity sensor 122 indicates that the steering wheel is being rotated clockwise. The steering event direction module 176 can detect that the driver is steering the vehicle 100 to the left, when the output of the steering wheel angle polarity sensor 122 indicates that the steering wheel is being rotated counterclockwise.

The steering event determination module 174 can determine the type of steering event based on the value of the output of at least one of the steering input sensor 194 measured a predetermined length of time after the driver alert system triggering event detected by the alert system event detection module 172. The output of the steering input sensor 194 can be a steering wheel angular velocity of a steering wheel of the vehicle 100. The steering wheel angular velocity can be provided as an output of the steering wheel angular velocity sensor 112.

The predetermined length of time after the triggering event of the driver alert system 102 can be determined based on the speed of the vehicle 100 at the time the driver alert system triggering event detected by the alert system event detection module 172. The steering event determination module 174 can determine the speed of the vehicle 100 based on the output of the vehicle speed sensor 124. Further, the predetermined length of time after the driver alert system triggering event can increase as the speed of the vehicle 100 at the time of the driver alert system triggering event increases.

For example, the predetermined length of time is equal to a first predetermined length of time, when the speed of the vehicle 100 at the driver alert system triggering event is within a first speed range. The predetermined length of time is equal to a second predetermined length of time, when the speed of the vehicle 100 at the driver alert system triggering event is within a second speed range. The predetermined length of time is equal to a third predetermined length of time, when the speed of the vehicle 100 at the driver alert system triggering event is within a third speed range. The predetermined length of time is equal to a fourth predetermined length of time, when the speed of the vehicle 100 at the driver alert system triggering event is within a fourth speed range.

In one embodiment, the first predetermined length of time is about 1.0 seconds and the first predetermined vehicle speed range includes speed values that are greater than or equal to about 10 kph and less than or equal to about 20 kph. Further, the second predetermined length of time is about 0.8 seconds and the second predetermined vehicle speed range includes speed values that are greater than or equal to about 21 kph and less than or equal to about 35 kph. Additionally, the third predetermined length of time is about 0.5 seconds and the third predetermined vehicle speed range includes speed values that are greater than or equal to about 36 kph and less than or equal to about 55 kph. Also, the fourth predetermined length of time is about 0.2 seconds and fourth predetermined vehicle speed range includes speed values that are greater than or equal to about 56 kph. The values for the first through fourth predetermined lengths of time can be stored in the length of time level 184C of the driver alert system database 184. The values for the first through fourth predetermined vehicle speed ranges can be stored in the vehicle speed range level 184D of the driver alert system database 184.

As discussed, the steering event determination module 174 can determine the type of steering event based on the angular velocity of the steering wheel measured a predetermined length of time after the driver alert system triggering event is detected by the alert system event detection module 172.

The driver alert device 104 can include at least one of the audio alert device 148, the tactile alert device 150, the visual alert device 152, the steering reactive force device 196, and the braking reactive force device 198. The audio alert device 148 can provide the audio alert to the driver of the vehicle 100 regarding the occurrence of the driver alert system triggering event and/or presence of the obstacle 216. In one embodiment, the audio alert device 148 can be at least one speaker 154. In one embodiment, the audio alert has at least one of a location, a duration, and an intensity. At least one of the duration, the location, and the intensity of the audio alert can vary based on the driver alert level and the location of the obstacle 216.

The tactile alert device 150 can provide the tactile alert to the driver of the vehicle 100 regarding the occurrence of the driver alert system triggering event and/or the presence of the obstacle 216. In one embodiment, the tactile alert device 150 can be the steering wheel vibrator 156. The visual alert device 152 can provide the visual alert to the driver of the vehicle 100 regarding the occurrence of the driver alert system triggering event and/or the presence of the obstacle 216. In one embodiment, the visual alert device can be one or more of at least one display 158 and at least one LED 160.

In one or more embodiments, a system 102 for providing driver alerts may receive one or more outputs from one or more obstacle detection sensors 106 indicative of presence information associated with one or more obstacles. This presence information may include a position or location of an obstacle and one or more attributes associated with the obstacle, such as velocity, acceleration, direction, path, trajectory, current path, estimated trajectory or estimated path, etc. As an example, the radar unit 128 may be utilized to determine one or more of a velocity of an obstacle, an acceleration associated with an obstacle, or a deceleration associated with an obstacle, etc. Further, the camera 126, which may include an image capture component, may be utilized to determine the estimated path of an obstacle, such as by analyzing one or more captured images for turn signal indicators of obstacle vehicles (e.g., other vehicles which are obstacles). For example, the camera 126 may determine that an obstacle vehicle has an estimated path associated with a left turn or left lane change maneuver when the camera 126 captures an image of a vehicle with its left turn signal indicator activated. In other embodiments, an estimated path of an obstacle may be determined based on sequential position captures (e.g., utilizing the camera 126) to determine one or more positions of an obstacle at one or more corresponding times, thereby enabling the obstacle detection sensor 106 to 'map' a path of the obstacle and infer or extrapolate an estimated path accordingly.

However, because other vehicles may have turn signal indicators accidentally activated, etc., different components of the obstacle detection sensor 106 may be utilized to cross reference one or more determinations made with regard to an estimated path of another vehicle or obstacle vehicle. In other words, the estimated path of the obstacle may be determined based on the camera 126 and the radar unit 128.

For example, if the camera 126 captures an image of an obstacle which indicates that the obstacle has an associated turn indicator activated, but the radar unit 128 detects that the obstacle is travelling at a high rate of speed relative to an upcoming turn in the direction indicated by the camera 126, the obstacle detection sensor 106 may determine that no turn is upcoming in the estimated path of the obstacle vehicle. In other embodiments or in other scenarios, the obstacle detection sensor 106 may determine that there is an upcoming turn, but not until one or more roadways are passed.

Further, the camera 126 or image capture component may utilize a timing associated with a detected turn signal indicator or a velocity or acceleration determined by the radar unit 128 to estimate a path of an obstacle. For example, if the camera 126 detects that a turn signal indicator of an obstacle vehicle is activated, and the radar unit 128 subsequently determines that the obstacle vehicle is accelerating, the obstacle detection sensor 106 may elect to ignore the detection of the turn signal indicator (e.g., because drivers typically slow down when intending to initiate a turning maneuver). As another example, if the radar unit 128 determines that an obstacle vehicle is travelling thirty five mph, the camera 126 detects activation of a turn signal indicator for the obstacle vehicle, and a global positioning system (GPS) component or navigation component 146 determines that a first turn is five feet away and a second turn is one hundred feet away, the obstacle detection sensor 106 may estimate that the travel path for the obstacle vehicle is a turn onto the second turn rather than the first turn based on the distance from the obstacle vehicle to the subsequent turns.

In yet other embodiments, the obstacle detection sensor 106 may estimate a path for an obstacle vehicle based on a current lane of an obstacle vehicle. In other words, if an obstacle vehicle is detected on the far left lane of a three lane highway, and the camera of the vehicle 100 detects an activation of a right turn signal indicator for the obstacle vehicle, the obstacle detection sensor 106 may infer an estimated travel path for the obstacle vehicle as a lane change rather than a turn (e.g., because a right turn from a left lane, although possible, generally does not occur).

Further, other inferences may be utilized to supplement decision making or determinations made by the obstacle detection sensor 106. For example, if the obstacle vehicle is detected by the radar unit 128 as travelling at a high rate of speed, accelerating beyond a threshold aggressive driver acceleration threshold, weaving in and out of traffic (e.g., rate of change between lanes greater than an aggressive driver acceleration threshold, etc.), the obstacle detection sensor may estimate the path for the obstacle vehicle accordingly. Returning to the example above, where an obstacle vehicle is detected on the far left lane of a three lane highway, and the camera of the vehicle 100 detects an activation of a right turn signal indicator for the obstacle vehicle subsequent to the radar unit 128 detecting an acceleration greater than the aggressive driver acceleration threshold for the obstacle vehicle, the obstacle detection sensor 106 may infer an estimated path of a right turn in such a scenario. In this way, the obstacle detection sensor 106 may estimate a path of an obstacle based on context, previous driving maneuvers of the obstacle, etc.

In yet another embodiment, the obstacle detection sensor 106 may estimate a path of an obstacle based on a zip code or a location of a vehicle, a current traffic level, etc.

In one or more embodiments, a system 102 for providing driver alerts may receive one or more outputs from one or more obstacle steering input sensors 194 indicative of steering inputs or potential steering inputs which may be provided to the vehicle 100. This information may be utilized to determine an estimated path of a vehicle. For example, the brake switch 108 may provide the steering input sensor 194 with an indication that the vehicle 100 is braking, while the throttle opening angle sensor 118 may provide the steering input sensor 194 with an indication of when the vehicle is being provided gas or throttle. Similarly, or along the same lines, the vehicle speed sensor 124 (e.g., speedometer) may provide an indication of a velocity of the vehicle. The yaw sensor 120, steering wheel torque sensor 110, steering wheel angular velocity sensor 112, and the steering wheel angle polarity sensor 122 may provide an indication of whether a vehicle is turning left or right, and how 'hard' the corresponding turn is. In this way, the steering input sensor 194 may facilitate estimation of a path for the vehicle 100 for the vehicle path determination module 178. The turn signal switch 114 may be utilized to provide an indication of an intent to turn or change lanes, depending on context, similarly to the manner inferences are made using the obstacle detection sensor 106.

For example, the steering input sensor 194 may utilize GPS information from a navigation component 146 to determine an estimated path for the vehicle 100. In other words, the estimated path of the vehicle may be determined based on information received from the vehicle speed sensor 124 and the navigation component 146. For example, if the turn signal switch 114 determines that the turn signal switch is activated and is signaling for a left turn, but the vehicle speed sensor 124 detects that the vehicle is travelling at a high rate of speed relative to an upcoming turn, as indicated by GPS data received from the navigation component 146, the steering input sensor 194 may determine that the estimated path has no turn associated therewith. In other embodiments or in other scenarios, the steering input sensor 194 may determine that there is an upcoming turn at a second upcoming intersection or roadway, after one or more roadways, driveways, or intersections are passed.

In other embodiments, the estimated path of the vehicle 100 may be determined based on a current velocity of the vehicle, provided by the vehicle speed sensor 124. Further, the estimated path of the vehicle may be determined based on a current lane of the vehicle, as determined by a navigation component 146 or one or more cameras 126 of the vehicle 100. As an example, if the camera 126 determines that a vehicle 100 is in a center lane of a three lane road, the steering input sensor 194 may infer that steering inputs received from the steering input sensor 194 are indicative of a lane change, and not a turn, since turning maneuvers generally do not occur from the center lane. However, in one or more scenarios, such steering inputs may be determined to be indicative of a turning maneuver for calculation of the estimated path of the vehicle. For example, when turn-by-turn navigation is activated, the estimated path of the vehicle 100 may be inferred to be the same as the navigation route provided by the navigation component 146. In this way, the estimated path of the vehicle may be based on an output of the navigation component 146.

In one or more embodiments, a system 102 for providing driver alerts may change a display mode from a current view to a different view, such as a driver assisted view based on one or more trigger events. Examples of trigger events which would cause the display 158 to automatically change display modes to a driver assisted view may include when an estimated path for a vehicle 100 includes a lane change event, when one or more obstacles are detected, when one or more obstacles are detected in a blind spot area (e.g., associated with one or more portions of one or more alert zones), when a driver alert level is set to a high driver alert level, when an estimated time to collision (TTC) is less than a TTC threshold, when the time to collision module 192 determines a potential intersection or near intersection (e.g., crossing within a threshold time period) between an estimated path for the vehicle 100 and an estimated path for an obstacle, such as when an overlap or intersection is within one second or 1.2 s, etc. In this way, the driver alert module may manage one or more views of one or more of the displays 158 of the vehicle.

Figure 12A:
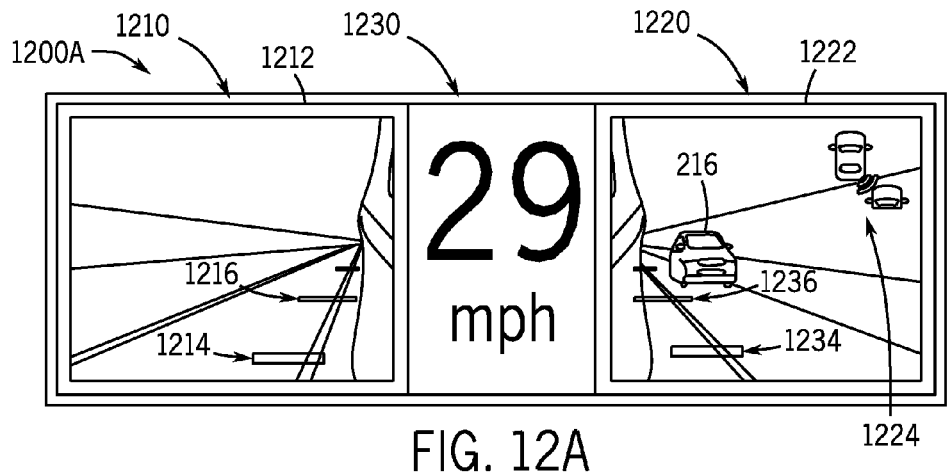
FIGS. 12A-C are diagrams of an example scenario of a vehicle equipped with a system for alerting a driver or driver alert system, according to one or more embodiments.
Figure 12B:
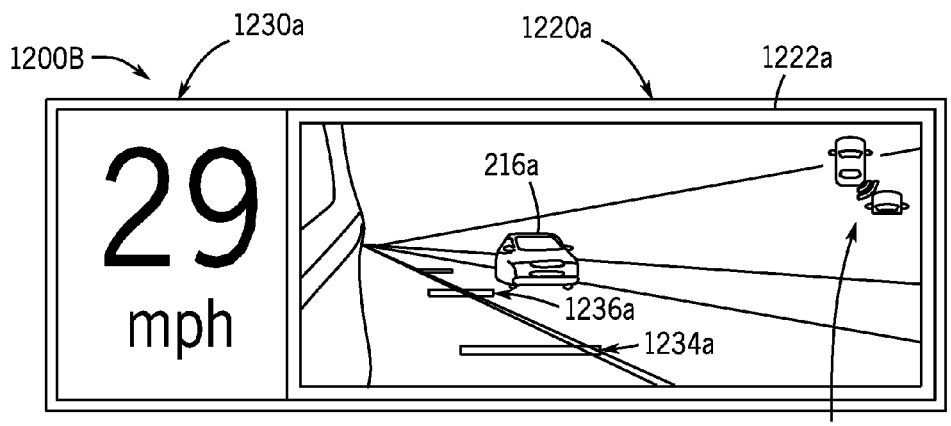
Figure 12C:
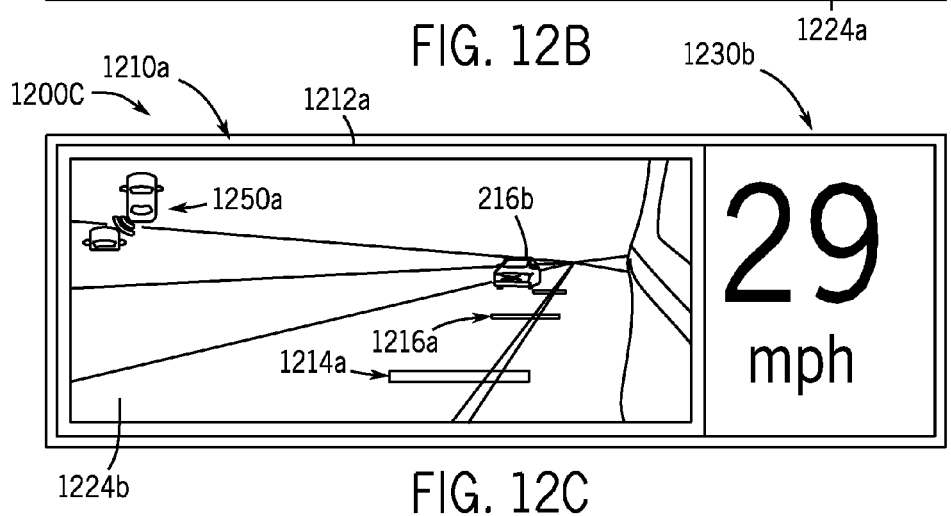

For example, during a lane change event, (e.g., as determined by the estimated path provided by the steering input sensor 194), the driver alert module 199 may automatically switch a heads up display 162 or rear view mirror display 169 to illustrate a driver assisted view, such as a view similar to one of the views provided by FIGS. 12A-C, for example. Stated another way, when a right turn is signaled (e.g., via turn signal switch 114) and determined to be a right lane change maneuver (e.g., via the steering input sensor 194 and/or the navigation component 146), a rear view mirror display 169 or other display 158 may automatically be set to display the assisted view, such as 1220A of FIG. 12A, for example. Conversely, when a left turn signal is activated, the display 158 may change to display the view of 1210A, which assists the driver of the vehicle with regard to obstacles located on the left of the vehicle. In this way, lane change events determined by the steering input sensor 194 may be utilized to change a mode of the display 158.

Other factors, such as obstacle attributes, including velocity of an obstacle, relative velocity of an obstacle, etc., may be utilized to determine a driver alert level (e.g., via the driver alert level determination module 182), which may be utilized to override or change a display 158 from a current view to an automatic driver assisted view, such as when an obstacle is in one or more portions of an alert zone associated with a blind spot of a vehicle, when the relative speed or velocity of the object is greater than a threshold, etc. Discussion with regard to the driver alert level determination module 182 is continued below.

The driver alert module 199 can alert the driver of the vehicle 100 using the driver alert device 104 based on the driver alert level determined by the driver alert level determination module 182. The alert provided to the driver by the driver alert module 199 using the driver alert device 104 is based on the driver alert level determined by the driver alert level determination module 182. For example, the driver alert module 199 can alert the driver to the presence of the triggering event using at least one of the LED 160 placed in an instrument cluster projecting a "BRAKE" message and the LED 160 placed above the instrument cluster, when the triggering event is the front collision warning event and the driver alert level for the obstacle 216 is the low driver alert level. Further, in one embodiment, the driver alert module 199 can alert the driver to the presence of the triggering event using at least one of the LED 160 placed in an instrument cluster illuminating a "BRAKE" message, the LED 160 placed above the instrument cluster, and an audio alarm using the speaker 154, when the triggering event is the front collision warning event and the driver alert level for the obstacle 216 is the high driver alert level.

In one or more embodiments, the driver alert module 199 may place or set the driver alert system 102 in at least one of a high driver alert level, a medium driver alert level, or a low driver alert level based on a blind spot event, a steering event, or a potential collision event. The driver alert module 199 may, in some embodiments, cycle the system 102 through different driver alert levels such that an alert level is present or set at a given time.

Figure 2:
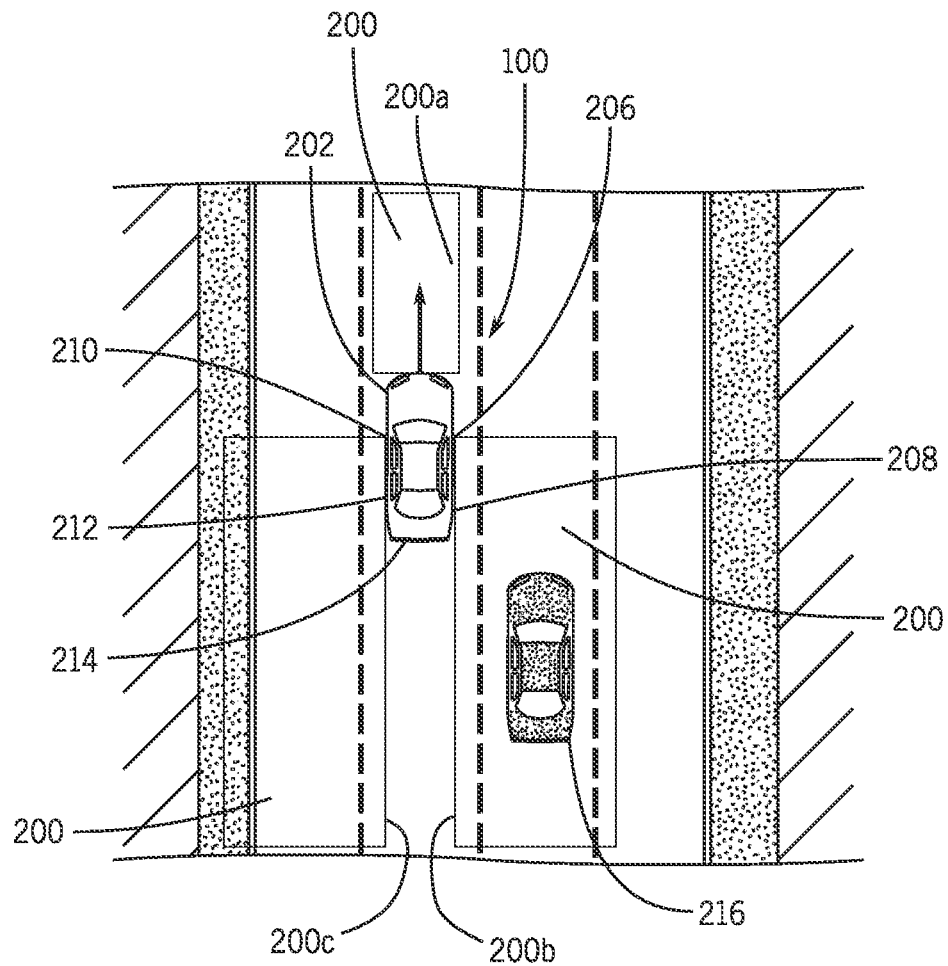
FIG. 2 is a depiction of an exemplary alert zone for the vehicle having the driver alert system of FIG. 1 in accordance with an exemplary embodiment.

As discussed, blind spot events are determined by the blind spot event detection module 188, such as when a vehicle or other obstacle enters an alert zone of a vehicle (e.g., alert zone 200 of FIG. 2). In one or more embodiments, the blind spot event detection module 188 may disable one or more alert zones when a path for a vehicle is unlikely to be taken. For example, when a vehicle is driving along a highway with concrete barriers in the median, if the vehicle is driving in the left lane such that the concrete barriers are to the left of the vehicle, the blind spot event detection module 188 may disable a left alert zone based on inferences or information indicating that no lane or road segment exists to the left of the vehicle. Here, the left camera 132, left radar unit 140, or other obstacle detection sensors may map the surrounding environment or operating environment and determine that no roadway is located on the left of the vehicle, and disable alerts from the left alert zone accordingly. In other embodiments, GPS data, dead reckoning, or other techniques may be utilized to enable or disable one or more alert zones in a similar fashion.

Similarly, steering events may be determined by the steering event detection module 186, which receives indication of steering inputs or potential steering inputs from one or more steering input sensors 194. Further, the absence of steering input, such as applying throttle, may be utilized or considered a steering input by the steering event detection module 186. Potential collision events may be determined by a collision warning event detection module, such as module 190, for example.

The driver alert level determination module 182 may determine different driver alert levels based on different combinations or permutations of steering inputs, detected objects, and attributes associated with detected objects. For example, the driver alert level determination module 182 may place the system 102 in a high driver alert level when an obstacle is detected within an alert zone and the alert zone corresponds to a blind spot within the driver's field of view. As another example, the driver alert level determination module 182 may place the system 102 in a high driver alert level when an obstacle is detected within an alert zone and the driver performs one or more steering inputs which indicate an intent to enter the area corresponding to that same alert zone. When the obstacle is detected within the alert zone, the alert zone does not correspond to a blind spot within the driver's field of view, and there is no steering input which indicates an intent to enter the area corresponding to the alert zone, the driver alert level determination module 182 may place the system 102 in a low driver alert level. Continuing with explanations of different alert levels, when the obstacle is detected within the alert zone, the alert zone corresponds with a blind spot within the driver's field of view, and there is no steering input which indicates an intent to enter the area corresponding to the alert zone, the driver alert level determination module 182 may place the system 102 at a medium driver alert level.

In one or more embodiments, the driver alert level determination module 182 may determine driver alert levels based on steering inputs received from the steering input sensor 194. For example, if an obstacle is following a vehicle and gaining ground such that the obstacle has a relative velocity greater than a relative velocity threshold and will enter an alert zone, and one or more steering inputs are received which indicate an obstacle is heading towards, about to enter the alert zone, or beginning to enter the alert zone, the driver alert level determination module 182 may place the system 102 in a high driver alert level. In other embodiments, the driver alert level determination module 182 may place the system 102 at a medium or low alert level based on the relative velocity of the obstacle. In this way, steering inputs and detected obstacles or associated attributes for respective obstacles may be utilized to assign the system 102 a driver alert level.

Additionally, in one embodiment, the driver alert module 199 of the driver alert system 102 can provide priority to front collision warning triggering events. For example, when a front collision warning triggering event occurs simultaneously with a blind spot event, the driver alert module 199 can use the driver alert device 104 to provide a more prominent alert to the driver regarding the front collision warning event, while simultaneously providing a less prominent alert to the driver regarding the blind spot event. In one embodiment, the driver alert module 199 can provide a loud audio alarm using the front speakers 154 of the vehicle 100 to warn the driver regarding the front collision warning event, while providing a quieter audio alarm using the rear speakers of the vehicle 100 to warn the driver of the blind spot event.

Further, when a first triggering event, such as a front collision warning event, occurs simultaneously or concurrently with a second triggering event, such as a blind spot event, the driver alert module 199 can initially alert the driver to the presence of both events using the driver alert device 104, stop alerting the driver regarding the first triggering event once the danger associated with the first triggering event is mitigated (e.g. brakes applied to mitigate front collision), and continue alerting the driver regarding the second event until the danger associated with the second triggering event is mitigated.

Additionally, the driver alert module 199 can use the display 158 to provide a view of the road on which the vehicle 100 is travelling and any obstacles 216 beside and behind the vehicle 100 to the driver.

One or more of the following figures may be described with reference to one or more of the components of FIG. 1 in conjunction with elements of the following figures. For example, FIG. 2 is a depiction of an exemplary alert zone 200 for the vehicle 100 having the driver alert system 102 of FIG. 1 in accordance with an exemplary embodiment of the present application. The alert zone 200 can include a front alert zone 200a, a right alert zone 200b, and a left alert zone 200c. The output from one or more of the obstacle detection sensors 106 can be used by the obstacle detection module 180 to detect an obstacle in a front alert zone 200a. For example, the output from one or more of the camera 126 and the radar unit 128 can be used by the obstacle detection module 180 to detect an obstacle in the front alert zone 200a. In one embodiment, the output from at least one of the front camera 136 and the front radar unit 142 can be used by the obstacle detection module 180 to detect an obstacle in the front alert zone 200a.

The output from one or more of the obstacle detection sensors 106 can be used by the obstacle detection module 180 to detect an obstacle 216 in the right alert zone 200b. For example, the output from one or more of the camera 126 and the radar unit 128 can be used by the obstacle detection module 180 to detect the obstacle 216, as seen in the right alert zone 200b. In one embodiment, the output from at least one of the right camera 130, the rear camera 134, the right radar unit 138, and the rear radar unit 144 can be used by the obstacle detection module 180 to detect an obstacle 216 in the right alert zone 200b.

Similarly, the output from one or more of the obstacle detection sensors 106 can be used by the obstacle detection module 180 to detect an obstacle in the left alert zone 200c. For example, the output from one or more of the camera 126 and the radar unit 128 can be used by the obstacle detection module 180 to detect an obstacle in the left alert zone 200c. In one embodiment, the output from at least one of the left camera 132, the rear camera 134, the left radar unit 140, and the rear radar unit 144 can be used by the obstacle detection module 180 to detect an obstacle in the left alert zone 200c.

The front alert zone 200a can be an area in the current lane of travel of the vehicle 100 extending from the front 202 of the vehicle 100 to a predetermined front alert zone length. In one embodiment, the predetermined front alert zone length can be about 8 meters.

The right alert zone 200b can be an area extending widthwise from the right side 208 of the vehicle 100 to a predetermined right alert zone width and extending length wise from a predetermined right zone length starting point rearward to a predetermined right zone length ending point located a predetermined distance from a rear 214 of the vehicle 100. In one embodiment, the predetermined right alert zone width can be about 3 meters, the predetermined right zone length starting point can be the right mirror 206 of the vehicle 100, and the predetermined distance from a rear 214 of the vehicle 100 can be about 50 meters. In other embodiments, the predetermined distance from a rear 214 of the vehicle 100 can be about 3 meters or about 6.5 meters. In other embodiments, different starting points, zone lengths, or zone widths may be selected, such as for the predetermined right zone length starting point, predetermined right alert zone width, and predetermined distance from the rear 214 of the vehicle 100.

The left alert zone 200c can be an area extending widthwise from the left side 212 of the vehicle 100 to a predetermined left alert zone width and extending length wise from a predetermined left zone length starting point rearward to a predetermined left zone length ending point located a predetermined distance from a rear 214 of the vehicle 100. In one embodiment, the predetermined left alert zone width can be about 3 meters, the predetermined left zone length starting point can be the left mirror 210 of the vehicle 100, and the predetermined distance from a rear 214 of the vehicle 100 can be about 50 meters. In other embodiments, the predetermined distance from a rear 214 of the vehicle 100 can be about 3 meters or about 6.5 meters. Further, a different predetermined left zone length starting point, predetermined left alert zone width, and predetermined distance from the rear 214 of the vehicle 100 may be utilized.

It will be appreciated that the obstacle detection sensor 106 may generally be capable of detecting obstacles which are not necessarily located within one or more of the alert zones 200. In other words, although an object or obstacle may be detected by the obstacle detection sensor 106, the driver alert device 104 may not provide an alert until the obstacle is at least approaching one or more of the alert zones 200 or within an alert zone. Explained another way, if an obstacle is outside of an alert zone and the obstacle detection sensor 106 determines that the obstacle is not headed in an estimated path which intersects or crosses with the vehicle 100 itself or one or more of the alert zones 200 (e.g., 200a, 200b, or 200c), no alert may be provided by the driver alert device 104. In other scenarios, it may be possible for the driver alert device 104 to provide alerts even when no object is present in an alert zone 200 based on detection or determination that an object is heading into an alert zone 200, such as when an obstacle vehicle is quickly approaching a vehicle from behind, for example.

In FIG. 2, if a vehicle 100 utilizes turn signal switch 114 to activate a right turn signal, while obstacle 216 is present in a right alert zone 200b, the obstacle detection sensor 106 may notify the blind spot event detection module 188 of the presence of the obstacle 216 while activation of the turn signal switch 114 may indicate an intent to turn (e.g., a right turn in this example). Based on this information, the blind spot event detection module 188 may determine that a blind spot event has occurred. Additionally, the blind spot event detection module 188 may make the blind spot event determination based on whether the driver steers right, steers right and hesitates, steers right and then back left, etc. using information from the steering input sensor 194. In other words, in the event that a driver signals for a right turn with the turn signal switch 114 and begins steering right, the blind spot event detection module 188 may determine that a blind spot event has occurred. However, continuing on, if the driver looks over, realizes that obstacle 216 is present on the right, and hesitates with continuing steering right or takes corrective action by steering slightly left, as determined using steering input sensor 194, the blind spot event detection module 188 may cancel the blind spot event because of an inference that the driver is aware of the blind spot obstacle.

Figure 3:
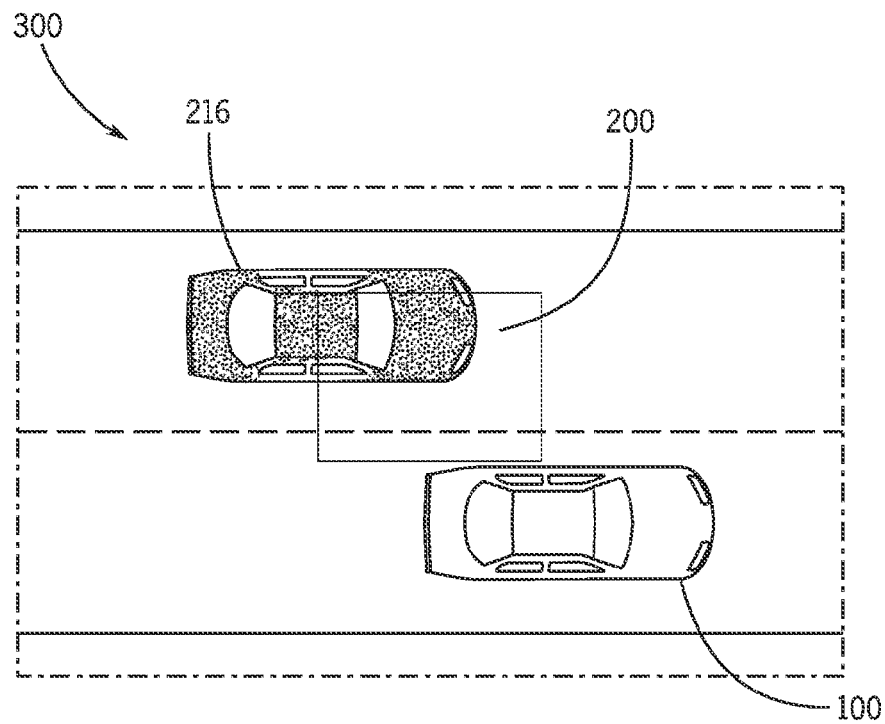
FIG. 3 is a diagram showing detection of a blind spot event by the driver alert system of FIG. 1 in accordance with an exemplary embodiment.

FIG. 3 is a diagram 300 showing a detection of a blind spot event by the driver alert system 102 of FIG. 1 in accordance with an exemplary embodiment of the present application. In FIG. 3, the blind spot event detection module 188 of the driver alert system 102 (shown in FIG. 1) detects an obstacle 216 in an alert zone 200 of the vehicle 100 based on the output received from at least one of the obstacle detection sensor 106, the obstacle detection module 180, and the turn signal switch 114. The output received from the turn signal switch 114, when actuated by the driver indicates that the driver intends to navigate the vehicle 100 in the direction of the obstacle 216 in the alert zone 200. For example, the blind spot event detection module 188 can detect the blind spot event based on the output of at least one of the obstacle detection sensors 106 indicating that an obstacle is present in an alert zone 200 of the vehicle 100 and the driver of the vehicle 100 using the turn signal switch 114 to indicate an intent to navigate the vehicle 100 in the direction of the obstacle 216. In other words, the blind spot event detection module 188 can detect the blind spot event based on the output of the obstacle detection sensor 106, indicating that an obstacle is present in an alert area of the vehicle 100, and the output of the turn signal switch 114, indicating an intent by the driver to navigate the vehicle 100 in the direction of the obstacle 216.

Figure 4:
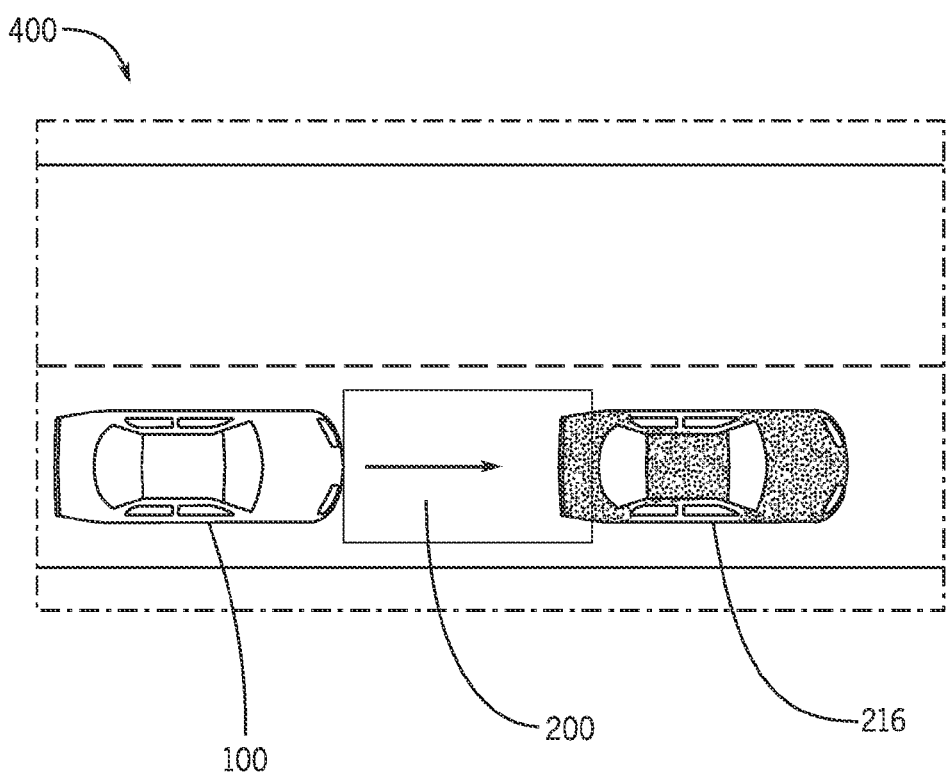
FIG. 4 is a diagram showing detection of a front collision warning event by the driver alert system of FIG. 1 in accordance with an exemplary embodiment.

With reference to FIGS. 1 and 4, the front collision warning event detection module 190 can detect the occurrence of a front collision warning event with an obstacle 216 in the alert zone 200 based on the speed of the vehicle 100 and the time to collision between the obstacle 216 and the vehicle 100. For example, the front collision warning event detection module 190 can detect the occurrence of a front collision warning event with an obstacle 216 in the alert zone 200 based on the output of at least one of the vehicle speed sensor 124, the obstacle detection sensor 106, and the time to collision module 192. In one embodiment, the front collision warning event detection module 190 can detect the occurrence of a front collision warning event based on the output of the vehicle speed sensor 124 and the output of the obstacle detection module 180, which provides an output indicating the presence of the obstacle 216 in the alert zone 200 and the time to collision between the vehicle 100 and the obstacle 216 in the alert zone 200.

In another embodiment, audio output associated with an audio alert device 148 of a driver alert system 102 of a vehicle may be implemented such that a rear speaker and a front speaker of a vehicle are adjusted in volume as an obstacle 216 passes through an alert zone 200 while an indication that a driver intends to enter an area corresponding to the alert zone 200 is received, such as activation of a turn signal switch 114. In one or more embodiments, the audio alert device 148 provides such audio output or audio feedback when the vehicle is moving in traffic, such as between 20 mph and 55 mph, for example.

FIG. 4 is a diagram 400 showing detection of a front collision warning event by the driver alert system 102 of FIG. 1 in accordance with an exemplary embodiment. In FIG. 4, the front collision warning event detection module 190 of the driver alert system 102 can detect a front collision warning event with the obstacle 216 in the alert zone 200 based on the output of the vehicle speed sensor 124 and the time to collision module 192. For example, the front collision warning event detection module 190 of the vehicle 100 detects a front collision warning event, when vehicle 100 is travelling forward, as indicated by the output of the vehicle speed sensor 124, the obstacle 216 is stopped in front of the vehicle 100 in the alert zone 200, as indicated by the output of the obstacle detection module 180, and the time to collision between the vehicle 100 and the obstacle 216 in the alert zone 200 is less than or equal to a predetermined stopped vehicle time to collision threshold, as indicated by the output of the time to collision module 192.

In one embodiment, the predetermined stopped vehicle time to collision threshold is about 2.1 seconds. The predetermined stopped vehicle time to collision threshold can be stored in a front collision warning event detection level 1848 of the driver alert system database 184. Here, in this example, the driver alert module 199 may change a mode of a display 158 to automatically switch views to a view from a front camera 136 based on the detected or determined front collision warning event.

In one or more embodiments, the time to collision module 192 may customize or adjust a predetermined stopped vehicle time to collision threshold based on driving habits of a driver, average speed of a driver, a current speed of the vehicle (e.g., received from the vehicle speed sensor 124), historical reaction times of the driver, a time of day, etc. In this way, different scenarios may result in determination of a front collision warning event, no front collision warning event, or front collision warning events associated with different thresholds. Similarly, the driver alert module 199 may utilize the time to collision threshold to change a view or mode of a display 158 accordingly. In this way, the driver alert system 102 may change the display 158 to show a video feed associated with a camera farther ahead of time at night than during the day, for example. Along the same lines, different thresholds may be utilized to modify the display 158 using more cautious timings (e.g., changing or overriding the display 158 farther ahead of time), such as when infotainment is playing, for example. In other words, when infotainment is playing, the driver alert device 104 may provide more alerts or provide alerts sooner or with looser thresholds than when no infotainment is playing in the vehicle, as determined by the driver alert module 199.

The front collision warning event detection module 190 of the vehicle 100 also detects a front collision warning event, when the vehicle 100 is travelling forward, as indicated by the output of the vehicle speed sensor 124, the obstacle 216 is decelerating in front of the vehicle 100 in the alert zone 200, as indicated by the output of the obstacle detection module 180, and the time to collision between the vehicle 100 and the obstacle 216 in the alert zone 200 is less than or equal to a predetermined decelerating vehicle time to collision threshold, as indicated by the output of the time to collision module 192. In one embodiment, the predetermined decelerating vehicle time to collision threshold is about 2.4 seconds. In one or more embodiments, the time to collision module 192 may customize or adjust a predetermined decelerating vehicle time to collision threshold based on a rate of deceleration of an obstacle determined from the obstacle detection sensor 106 or a current vehicle speed or velocity received from the vehicle speed sensor 124. The predetermined decelerating vehicle time to collision threshold can be stored in a front collision warning event detection level 1848 of the driver alert system database 184.

The front collision warning event detection module 190 of the vehicle 100 also detects a front collision warning event, when the vehicle 100 is travelling forward, as indicated by the output of the vehicle speed sensor 124, the obstacle 216 in the alert zone 200 is moving at a slower rate of speed than the vehicle 100, as indicated by the obstacle detection module 180, and the time to collision between the vehicle 100 and the obstacle 216 in the alert zone 200 is less than or equal to a predetermined slow vehicle time to collision threshold, as indicated by the output of the time to collision module 192. In one embodiment, the predetermined slow vehicle time to collision threshold is about 2.0 seconds. The predetermined slow vehicle time to collision threshold can be stored in a front collision warning event detection level 1848 of the driver alert system database 184.

Figure 5:
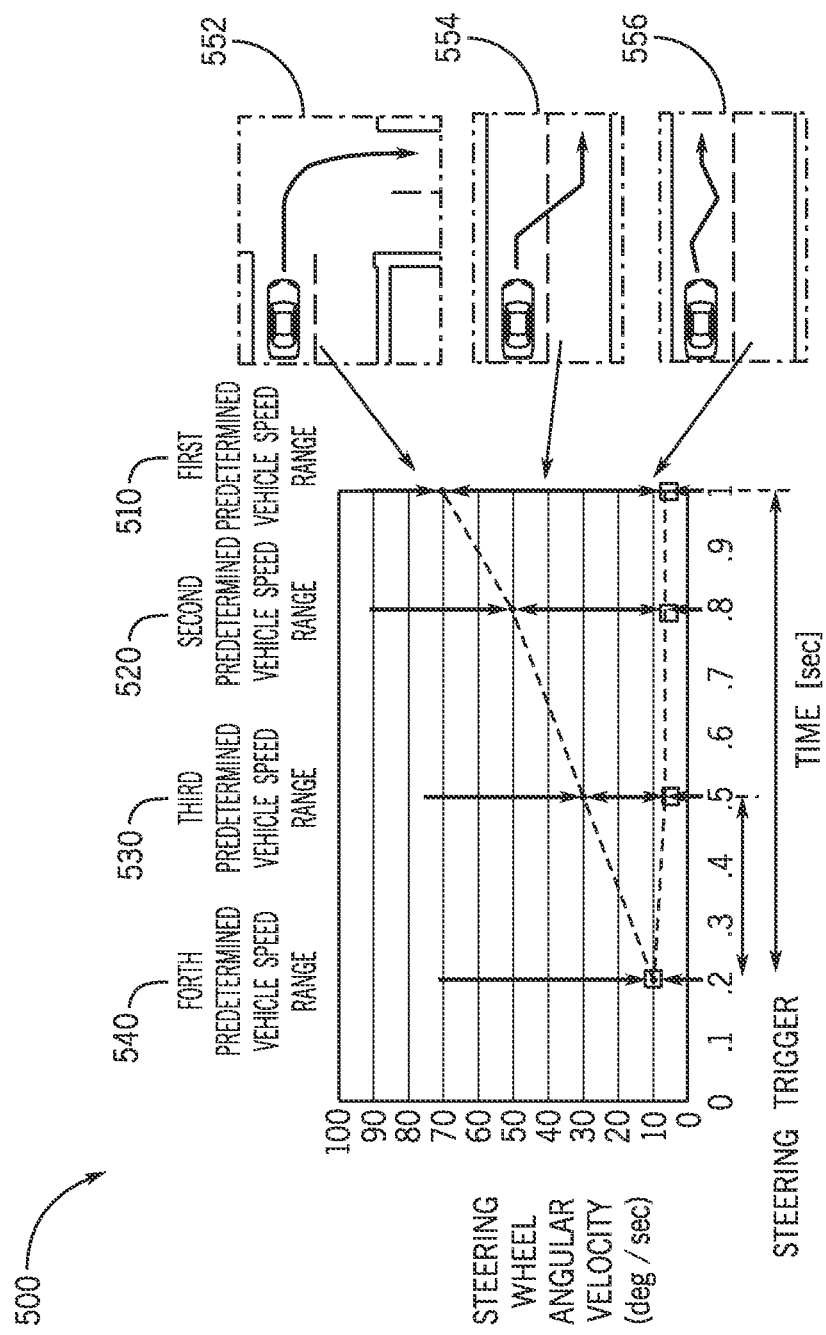
FIG. 5 is a chart showing steering wheel angular velocity ranges for types of steering events for the driver alert system of FIG. 1 in accordance with an exemplary embodiment.

FIG. 5 is a chart 500 showing steering wheel angular velocity ranges for types of steering events for the driver alert system 102 of FIG. 1 in accordance with an exemplary embodiment of the present application. The steering events can include a turn event 552, such as when the driver of the vehicle 100 uses the steering wheel to turn the vehicle 100 from a first road onto a second road at an intersection. The steering events can also include a lane change event 554, such as when the driver of the vehicle 100 uses the steering wheel to change the lane of travel of the vehicle 100 from a first lane to a second lane on a road. The steering events can also include a straight driving event 556, such as when the driver of the vehicle 100 uses the steering wheel to move within a lane of travel, while still maintaining the lane of travel. The straight driving event 556 does not necessarily always follow a 'straight' path, such as when a lane curve, and when the vehicle maintains the same lane, for example. In other words, a straight driving event 556 may include weaving or drifting which keeps the vehicle substantially within one lane, for example.

As illustrated in FIG. 5, the type of steering event can be determined using steering wheel angular velocities measured for each predetermined vehicle speed range (e.g., 540, 530, 520, 510, etc.). Although FIG. 5 illustrates four predetermined vehicle speed ranges, any number of vehicle speed ranges may be utilized. The steering wheel angular velocities can be grouped into adjacent non-overlapping ranges of steering wheel angular velocities, with each range representing a different type of steering event.

The steering event determination module 174 can determine the steering event type based on a value of an output of the steering input sensor 194 measured a predetermined length of time (e.g., 0.1 second time intervals or time increments) after the driver alert system triggering event. Although the time increment of FIG. 5 used is 0.1 s, any time increment may be utilized, such as a time increment as frequent as allowable by a controller or by the processor 168.

In any event, the steering event determination module 174 can determine the type of steering event by measuring the angular velocity of the steering wheel, using the steering wheel angular velocity sensor 112, at the expiration of the predetermined length of time after the triggering event, and comparing the measured angular velocity to the predetermined steering wheel angular velocity ranges representing the different types of steering events for the vehicle 100 from the driver alert system database 184. The predetermined length of time after the triggering event is determined by the speed of the vehicle 100 at the time of the triggering event.

In one or more embodiments, the steering event determination module 174 may determine the type of steering event based on the speed of the vehicle, the angular velocity of the steering wheel, elapsed time, or the change in angular velocity of the steering wheel over time. Further, more measurements made over a longer period of time provides a greater degree of confidence associated with a steering event type determination. For example, if a steering trigger event occurs at 540 (e.g. 0.2 seconds), measurements of the angular velocity of the steering wheel may provide some indication of whether the steering event is a turn event 552, lane change event 554, or straight driving event 556. At 530 (e.g. 0.5 seconds), when another angular velocity measurement is made, a greater degree of confidence may be associated with the steering event type determination. For example, as seen in FIG. 5, if the angular velocity of the steering wheel is greater than 30 degrees per second at 530, the steering event determination module 174 may determine that the steering event is a turn event 552. If the angular velocity of the steering wheel is between 0 degrees per second and 10 degrees per second at 530, the steering event determination module 174 may determine that the steering event is a straight driving event 556. Otherwise, the steering event determination module 174 may determine that the steering event is a lane change event 554 (e.g., when the angular velocity is between 10 and 30 deg/s). In other embodiments, different steering wheel angular velocity thresholds or ranges may be used to define respective driving events. Further, it will be appreciated that these thresholds or ranges may be defined based on elapsed time (e.g., from a steering trigger) or based on vehicle speed, for example.

According to one embodiment, the steering event determination module 174 can determine that the steering event type is the straight driving event 556, when the speed of the vehicle 100 at the driver alert system triggering event is within the first predetermined vehicle speed range 510 and the steering wheel angular velocity is within a first predetermined steering wheel angular velocity range at the expiration of the first predetermined length of time after the triggering event. Further, the steering event determination module 174 can determine that the steering event type is the lane change event 554, when the speed of the vehicle 100 at the driver alert system triggering event is within the first predetermined vehicle speed range 510 and the steering wheel angular velocity is within a second predetermined steering wheel angular velocity range at the expiration of the first predetermined length of time after the triggering event. Additionally, the steering event determination module 174 can determine that the steering event type is the turn event 552, when the speed of the vehicle 100 at the driver alert system triggering event is within the first predetermined vehicle speed range 510 and the steering wheel angular velocity is within a third predetermined steering wheel angular velocity range at the expiration of the first predetermined length of time after the triggering event.

Further, the steering event determination module 174 can determine that the steering event type is the straight driving event 556, when the speed of the vehicle 100 at the driver alert system triggering event is within the second predetermined vehicle speed range 520 and the steering wheel angular velocity is within a fourth predetermined steering wheel angular velocity range at the expiration of the second predetermined length of time after the triggering event. Additionally, the steering event determination module 174 can determine that the steering event type is the lane change event 554, when the speed of the vehicle 100 at the driver alert system triggering event is within the second predetermined vehicle speed range 520 and the steering wheel angular velocity is within a fifth predetermined steering wheel angular velocity range at the expiration of the second predetermined length of time after the triggering event. Further, the steering event determination module 174 can determine that the steering event type is a turn event 552, when the speed of the vehicle 100 at the driver alert system triggering event is within the second predetermined vehicle speed range 520 and the steering wheel angular velocity is within a sixth predetermined steering wheel angular velocity range at the expiration of the second predetermined length of time after the triggering event.

Also, the steering event determination module 174 can determine that the steering event type is the straight driving event 556, when the speed of the vehicle 100 at the driver alert system triggering event is within the third predetermined vehicle speed range 530 and the steering wheel angular velocity is within a seventh predetermined steering wheel angular velocity range at the expiration of the third predetermined length of time after the triggering event. Further, the steering event determination module 174 can determine that the steering event type is the lane change event 554, when the speed of the vehicle 100 at the driver alert system triggering event is within the third predetermined vehicle speed range 530 and the steering wheel angular velocity is within an eighth predetermined steering wheel angular velocity range at the expiration of the third predetermined length of time after the triggering event. Additionally, the steering event determination module 174 can determine that the steering event type is the turn event 552, when the speed of the vehicle 100 at the driver alert system triggering event is within the third predetermined vehicle speed range 530 and the steering wheel angular velocity is within a ninth predetermined steering wheel angular velocity range at the expiration of the third predetermined length of time after the triggering event.

Additionally, the steering event determination module 174 can determine that the steering event type is the straight driving event 556, when the speed of the vehicle 100 at the driver alert system triggering event is within the fourth predetermined vehicle speed range 540 and the steering wheel angular velocity is within a tenth predetermined steering wheel angular velocity range at the expiration of the fourth predetermined length of time after the triggering event. Further, the steering event determination module 174 can determine that the steering event type is the turning event 552, when the speed of the vehicle 100 at the driver alert system triggering event is within the fourth predetermined vehicle speed range 540 and the steering wheel angular velocity is within an eleventh predetermined steering wheel angular velocity range at the expiration of the fourth predetermined length of time after the triggering event.

In one embodiment, the first predetermined length of time can be about 1.0 seconds and the first predetermined vehicle speed range includes speed values that are greater than or equal to about 10 kph and less than or equal to about 20 kph. Further, the second predetermined length of time can be about 0.8 seconds and the second predetermined vehicle speed range includes speed values that are greater than or equal to about 21 kph and less than or equal to about 35 kph. Additionally, the third predetermined length of time can be about 0.5 seconds and the third predetermined vehicle speed range includes speed values that are greater than or equal to about 36 kph and less than or equal to about 55 kph. Also, the fourth predetermined length of time can be about 0.2 seconds and fourth predetermined vehicle speed range includes speed values that are greater than or equal to about 56 kph.

Further, the first predetermined steering wheel angular velocity range includes steering wheel angular velocity values that are less than or equal to about 6 deg/s, the second predetermined steering wheel angular velocity range includes steering wheel angular velocity values that are both greater than or equal to about 7 deg/s and less than or equal to about 70 deg/s, and the third predetermined steering wheel angular velocity range includes steering wheel angular velocity values that are greater than or equal to about 71 deg/s. Also, the fourth predetermined steering wheel angular velocity range includes steering wheel angular velocity values that are less than or equal to about 6 deg/s, the fifth predetermined steering wheel angular velocity range includes steering wheel angular velocity values that are both greater than or equal to about 7 deg/s and less than or equal to about 50 deg/s, and the sixth predetermined steering wheel angular velocity range includes steering wheel angular velocity values that are greater than or equal to 51 deg/s. Additionally, the seventh predetermined steering wheel angular velocity range includes steering wheel angular velocity values that are less than or equal to about 6 deg/s, the eighth predetermined steering wheel angular velocity range includes steering wheel angular velocity values that are both greater than or equal to about 7 deg/s and less than or equal to about 30 deg/s, and the ninth predetermined steering wheel angular velocity range includes steering wheel angular velocity values that are greater than or equal to about 31 deg/s. Further, the tenth predetermined steering wheel angular velocity range includes steering angle values that are less than or equal to about 10 deg/s, and the eleventh predetermined steering wheel angular velocity range includes steering angle values that are greater than or equal to about 11 deg/s. In one embodiment, the values for the first through eleventh predetermined steering wheel angular velocity range can be stored in the steering wheel angular velocity range level 184E of the driver alert system database 184.

The driver alert level determination module 182 can determine a driver alert level for the driver alert system triggering event. The driver alert level determination module 182 can determine the driver alert level based on a comparison of a driver alert level value for the obstacle 216 detected in the alert zone 200 to a predetermined driver alert level threshold. The driver alert level value can be calculated by the driver alert level determination module using at least one of the range of the obstacle 216 from the vehicle 100 and the relative velocity of the obstacle 216 (e.g., the velocity of the obstacle 216 relative to the velocity of the vehicle 100).

As an example, the range of the obstacle from the vehicle, the relative velocity of the obstacle, and other attributes or characteristics associated with the obstacle may be calculated or determined by the obstacle detection sensor 106 or in combination with one or more vehicle sensors, such as the vehicle speed sensor 124, etc.

For example, the driver alert level value can be the range of the obstacle 216 over or divided by the relative velocity of the obstacle 216 (range/relative velocity). In one embodiment, the driver alert level determination module 182 determines that the driver alert level for the obstacle 216 is the high driver alert level, when the driver alert level value of the obstacle 216 is less than or equal to than the predetermined driver alert level threshold. Further, the driver alert level determination module 182 determines that the driver alert level for the obstacle 216 is the low driver alert level, when the driver alert level value of the obstacle 216 is greater than the predetermined driver alert level threshold. The predetermined driver alert level threshold for the driver alert level determination module 182 can be at least one of a predetermined numerical value, a predetermined line, and based on a predetermined curve. The predetermined driver alert level threshold can be stored in a driver alert level threshold level 184F of the driver alert system database 184.

Figure 6:
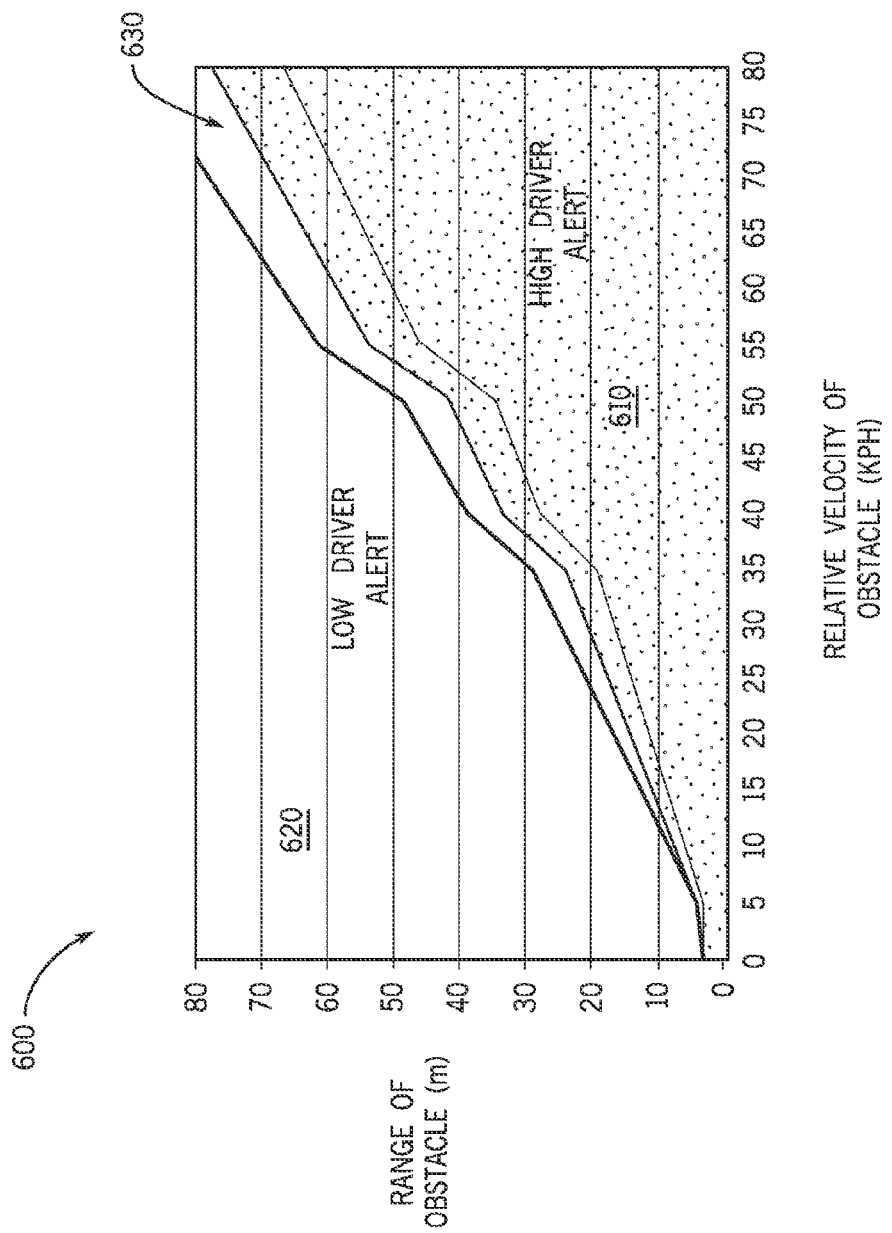
FIG. 6 is a plot of the predetermined driver alert level threshold for the driver alert level determination module of the driver alert system of FIG. 1 that can be used when the driver alert system triggering event is the steering event in accordance with an exemplary embodiment.

FIG. 6 is a plot 600 of the predetermined driver alert level threshold for the driver alert level determination module 182 of the driver alert system 102 of FIG. 1 that can be used when the driver alert system triggering event is the steering event in accordance with an exemplary embodiment of the present application. In this embodiment, the predetermined driver alert level threshold is a curve. Further, the driver alert level determination module 182 determines that the driver alert level for the obstacle 216 is the high driver alert level 610, when the driver alert level value of the obstacle 216 falls on or below the predetermined driver alert level threshold 630 shown in FIG. 6. Further, the driver alert level determination module 182 determines that the driver alert level for the obstacle 216 is the low driver alert level 620, when the driver alert level value of the obstacle 216 falls above the predetermined driver alert level threshold shown in FIG. 6.

Figure 7:
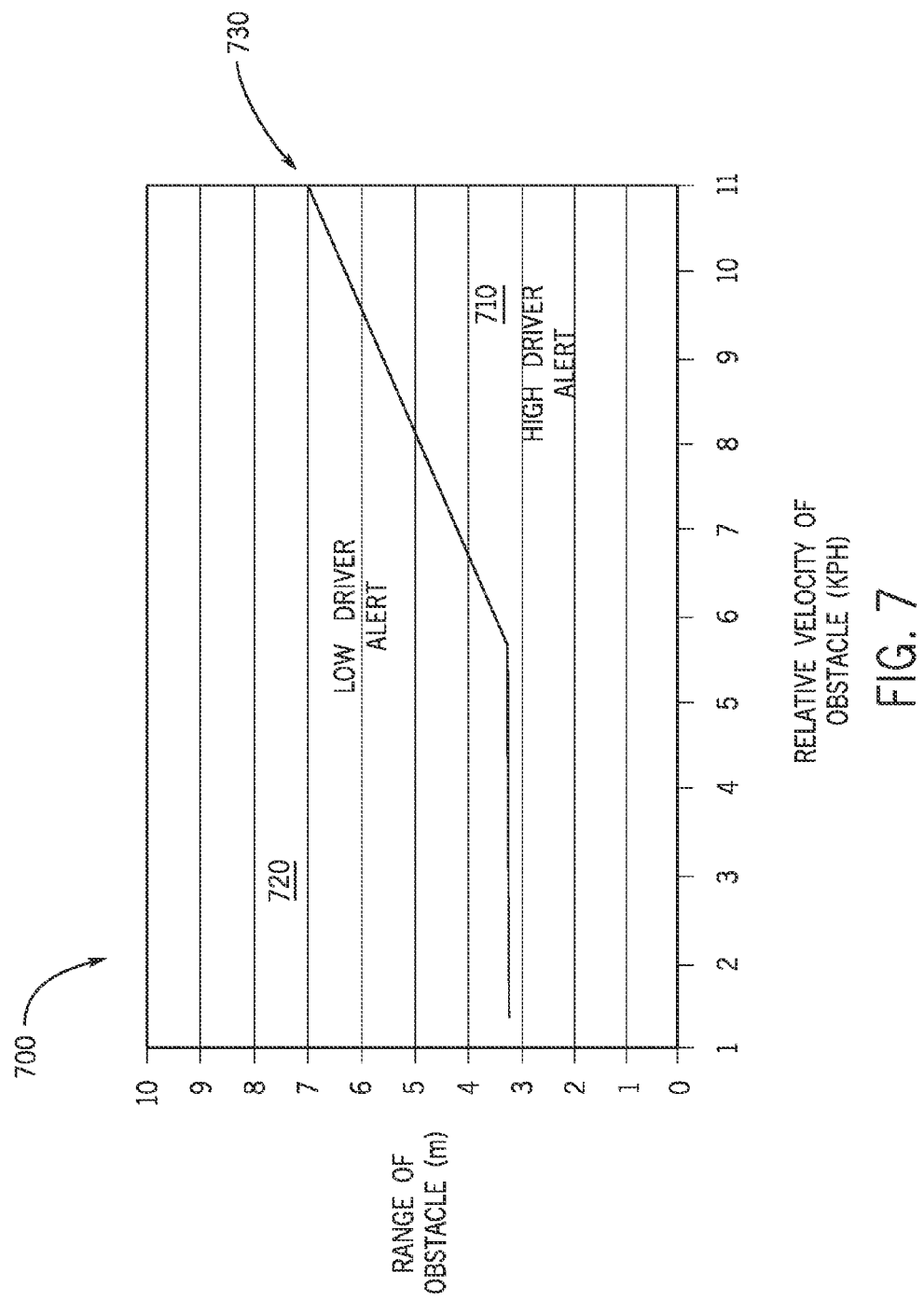
FIG. 7 is a plot of the predetermined driver alert level threshold for the driver alert level determination module of the driver alert system of FIG. 1 that can be used when the driver alert system triggering event is the blind spot event in accordance with an exemplary embodiment.

FIG. 7 is a plot 700 of the predetermined driver alert level threshold for the driver alert level determination module 182 of the driver alert system 102 of FIG. 1 that can be used when the driver alert system triggering event is the blind spot event in accordance with an exemplary embodiment of the present application. In this embodiment, the predetermined driver alert level threshold is a curve. The driver alert level determination module 182 can determine that the driver alert level for the obstacle 216 is the high driver alert level 710, when the driver alert level value of the obstacle 216 falls on or below the predetermined driver alert level threshold 730 shown in FIG. 7. Further, the driver alert level determination module 182 can determine that the driver alert level for the obstacle 216 is the low driver alert level 720, when the driver alert level value of the obstacle 216 falls above the predetermined driver alert level threshold shown in FIG. 7.

Figure 8:
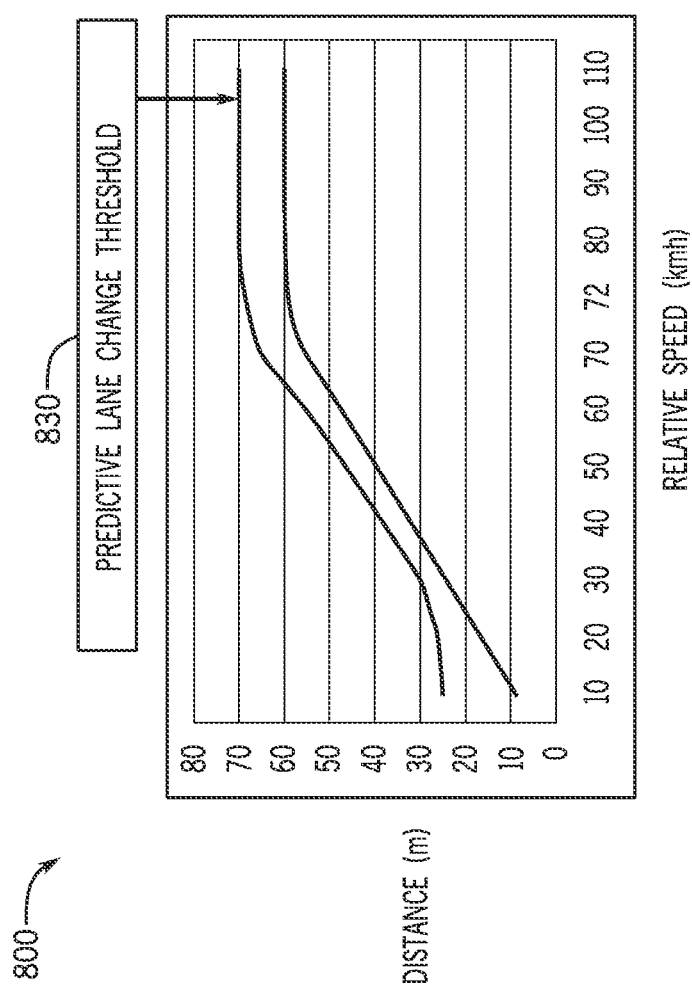
FIG. 8 is a plot of a predictive lane change threshold for the driver alert level determination module of the driver alert system of FIG. 1, in accordance with an exemplary embodiment.
Figure 9:
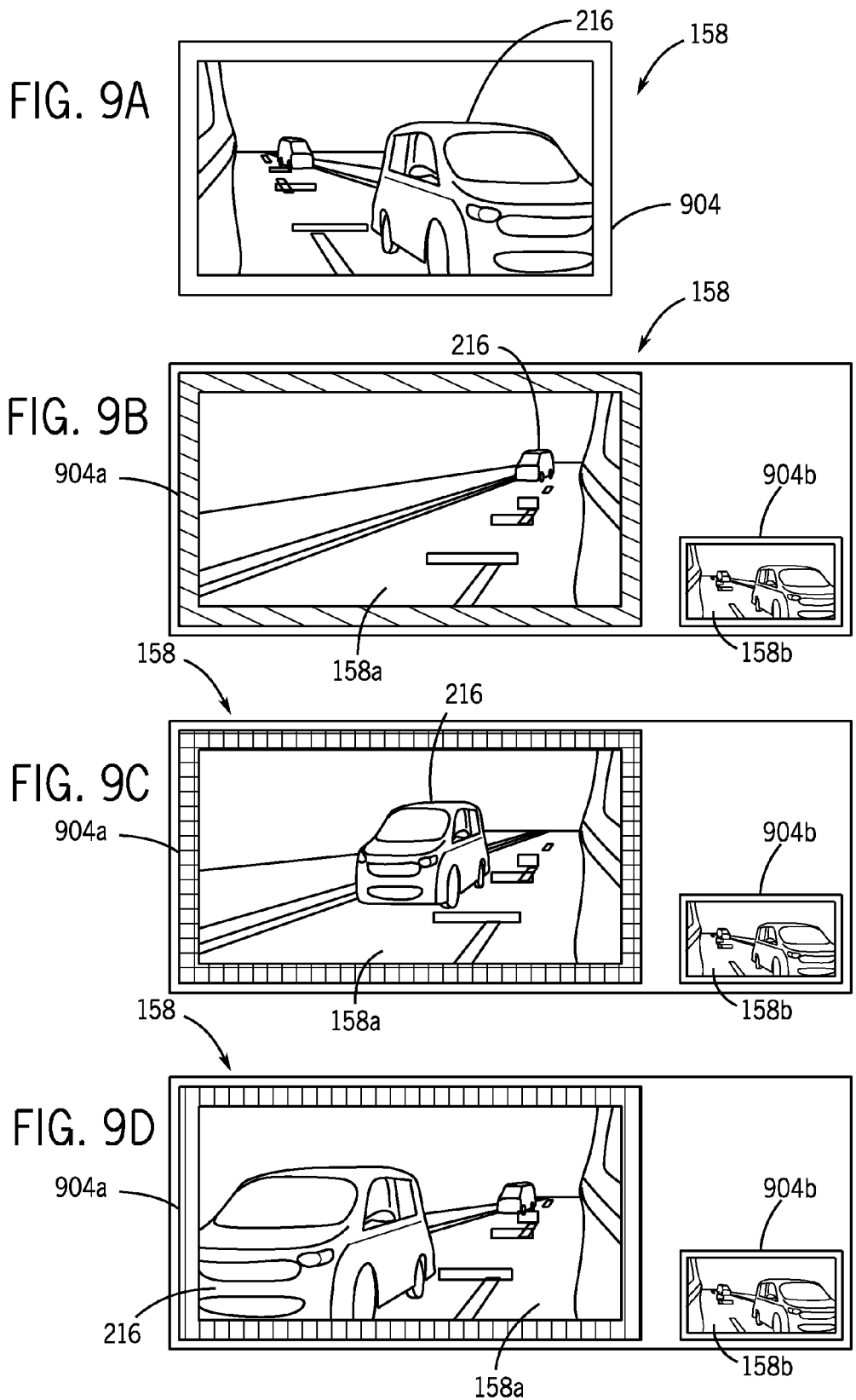
FIGS. 9A-D are depictions of the display of the vehicle that can be used by the driver alert system of FIG. 1 to provide a view of the road to the driver in accordance with an exemplary embodiment.

FIG. 8 is a plot 800 of an example predictive lane change threshold 830 for the driver alert level determination module 182 of the driver alert system of FIG. 1, in accordance with one or more embodiments.

FIGS. 9A-D are depictions of the display 158 of the vehicle 100 that can be used by the driver alert system 102 of FIG. 1 to provide a view of the road to the driver in accordance with an exemplary embodiment of the present application. For example, the display 158 can provide the driver a view of the road, and any obstacles 216 detected by the obstacle detection module 180, such as obstacles 216 detected by the obstacle detection module 180 in the direction of a turn or lane change indicated by the driver, when the steering event detection module 186 detects a steering event. Further, the display 158 can provide the driver a view of the road, and any obstacles 216 detected by the obstacle detection module 180, when the blind spot event detection module 188 detects a blind spot event.

The display 158 can include a border 904 around a periphery of the display 158. The border 904 can have a color that changes based on the detection of an obstacle 216 in the alert zone 200 of the vehicle 100 by the obstacle detection module 180, the driver alert level for the detected obstacle 216, and an intent of the driver to move the vehicle 100 into the lane shown in the display 158 as indicated by the output of the turn signal switch 114. In other words, the driver alert level determination module 182 may change the color of the border 904 based on a determined driver alert level (e.g., high driver alert level, medium driver alert level, low driver alert level, etc.). As discussed, the driver alert level determination module 182 uses the relative velocity of the obstacle 216 and a likelihood of collision or intersection determination to determine the driver alert level for the obstacle 216.

Examples of the intersection determination may include determining that an estimated path of an obstacle 216 intersects with an estimated path of the vehicle, nearly intersecting (e.g., the paths cross within a threshold time period), never intersecting, or intersecting after a threshold time period (e.g., the paths of the vehicle and the obstacle cross, but not within a window of time such that collision is possible or likely). For example, the driver alert module 199 may select the color of the border 904 to be green when no intersection or an intersection after a threshold time period is estimated.

As another example, the driver alert module 199 may select the color of the border 904 to be red when a relative velocity of a passing vehicle (e.g., obstacle) is high or greater than a relative velocity threshold. In other words, when another vehicle is passing or being passed by the vehicle in an extremely quick manner such that the threshold relative velocity threshold is exceeded, the driver alert module 199 may select a color accordingly. Further, the driver alert module 199 may select different shades of colors, utilize different brightness levels, etc. based on the relative velocity of the obstacle. Therefore, if another vehicle zooms by at 120 mph while the vehicle equipped with the driver alert system 102 is travelling 30 mph, the driver alert module 199 may display the border 904 of the view of the obstacle in bright red, for example. In other embodiments, the driver alert module 199 may flash the border 904 based on the relative velocity or driver alert level. In this way, the color of the border 904 may be utilized to provide indications associated with driver awareness.

In one embodiment, the border 904 can be a first predetermined color, when an obstacle 216 is not detected in the alert zone 200 of the vehicle 100 by the obstacle detection module 180, such as green, for example. The border 904 can be a second predetermined color, when an obstacle 216 detected in the alert zone 200 has a low driver alert level. For example, the border 904 can be the second predetermined color, when an obstacle 216 is detected by the obstacle detection module 180 and the driver alert level determination module 182 determines that the driver alert level for the driver alert system triggering event is the low driver alert. The frame can be a third predetermined color, when an obstacle 216 detected in the alert zone 200 has the high driver alert level. For example, the border 904 can be the third predetermined color, when an obstacle 216 is detected by the obstacle detection module 180 and the driver alert level determination module 182 determines that the driver alert level for the driver alert system triggering event is the high driver alert level.

In one embodiment, the first predetermined color can be green, the second predetermined color can be yellow, and the third predetermined color can be red. Further, the size of the display 158 can also change based on an intent of the driver to move the vehicle 100 into the lane shown in the display 158. For example, the size of the display 158 can expand, when the driver expresses an intent to move the vehicle 100 into the lane shown in the display 158 such that the obstacle 216 appears larger or is zoomed on the display 158.

The changing color of the border 904 and the expanding of the display 158 are shown in FIGS. 9B-D. Further, the display 158 can have at least one of a left lane display 158a having a border 904a and a right lane display 158b having a border 904b. The left lane display 158a can show a view of the lane and any obstacles 216 to the left and left rear of the vehicle 100. The right lane display 158b can show a view of the lane and any obstacles 216 to the right and right rear of the vehicle 100. Here, in FIGS. 9B-D, because the driver of the vehicle is signaling to turn left (e.g., as indicated via the turn signal switch 114), the left portion of display 158 is enlarged or zoomed in, while the right lane display 158b is shrunk or zoomed out.

In one embodiment shown in FIG. 9B, the color of the border 904a of the left lane display 158a can be changed to green based on a low driver alert level (e.g., indicative of a large distance between the vehicle and the obstacle or a low relative velocity of the obstacle) and the size of the left lane display 158a can be expanded, when the driver expresses an intent to move the vehicle 100 into the lane associated with the obstacle and the obstacle detection module 180 does not detect an obstacle 216 in the lane to the left of the vehicle 100, such as within an alert zone, for example. In other words, the driver alert module 199 may change the color of the border 904 to green in a scenario where no obstacles are in an alert zone corresponding to an area which a driver intends to enter and when the driver alert level associated with the corresponding alert zone is low, thus indicating a low likelihood of collision with an obstacle (e.g., based on a low relative velocity of the obstacle and/or a large distance or range between the obstacle and the vehicle).

Further, in another embodiment shown in FIG. 9C, the color of the border 904a of the left lane display 158a can be changed to yellow and the size of the left lane display 158a can be expanded, when the driver expresses an intent to move the vehicle 100 into a lane to the left of the vehicle 100, the obstacle detection module 180 detects an obstacle 216 in the lane to the left of the vehicle 100, and the driver alert level determination module 182 determines that the driver alert level for the driver alert system triggering event is the low driver alert level. In other words, the driver alert module 199 may change the color of the border 904 to yellow in a scenario where obstacles border an alert zone corresponding to an area which a driver intends to enter and when the driver alert level associated with the corresponding alert zone is low, thus indicating a low likelihood of collision with an obstacle (e.g., based on a low relative velocity of the obstacle and/or a large distance or range between the obstacle and the vehicle). Stated yet another way, the driver alert module 199 may assign the border 904 a yellow color when vehicles are travelling at a relatively even velocities with respect to one another and a lane change is possible, with caution from the driver of the vehicle.

Further, in another embodiment shown in FIG. 9D, the color of the border 904a of the left lane display 158a can be changed to red and the size of the left lane display 158a can be expanded, when the driver expresses an intent to move the vehicle 100 into lane to the left of the vehicle 100, the obstacle detection module 180 detects an obstacle 216 in the lane to the left of the vehicle 100, and the driver alert level determination module 182 determines that the driver alert level for the driver alert system triggering event is the high driver alert level. Here, the driver alert module 199 may assign the color of the border 904 to be red to indicate that a lane change or estimated driving maneuver is not recommended. Based on the driver alert level, precautionary action may be taken by the steering reactive force device 196 or the braking reactive force device 198. For example, steering assistance may be provided by the steering reactive force device 196 to mitigate drifting towards the obstacle or prevent the collision altogether when an imminent collision is determined by the time to collision module 192. Similarly, automatic braking may be implemented by the braking reactive force device 198 to mitigate damage or a collision, such as in a scenario where no vehicles or obstacles are detected behind the vehicle 100 by the rear camera 134 or the rear radar unit 144.

The color change of the border 904 and the increase in size of the display 158 thus allows the driver to quickly and easily ascertain whether any obstacle 216 has been detected in the lane the driver intends to enter, and also indicates the driver alert level for any driver alert system triggering event.

With reference to FIG. 1, the driver alert system 102 can use at least one of the border 904 of the display 158, the steering wheel vibrator 156, and the braking reactive device to warn the driver of the presence of an obstacle 216 in the alert zone 200, when the speed of the vehicle 100 is in the first predetermined vehicle speed range. Further, the driver alert system 102 can use the border 904 of the display 158, the speaker 154, the steering wheel vibrator 156, the steering reactive force device 196, and the braking reactive force device 198 to warn the driver of the presence of an obstacle 216 in the alert zone 200, when the speed of the vehicle 100 is in the second predetermined vehicle speed range. Additionally, the driver alert system 102 can use the border 904 of the display 158, the speaker 154, the steering wheel vibrator 156, the steering reactive force device 196, and the braking reactive force device 198 to warn the driver of the presence of an obstacle 216 in the alert zone 200, when the speed of the vehicle 100 is in the third predetermined vehicle speed range. Further, the driver alert system 102 can use the border 904 of the display 158, the speaker 154, the steering wheel vibrator 156, and the steering reactive force device 196 to warn the driver of the presence of an obstacle 216 in the alert zone 200, when the speed of the vehicle 100 is in the fourth predetermined vehicle speed range.

In one or more embodiments, a display 158 of a vehicle 100 may automatically be switched from a current view to one or more lane change views or one or more driver assist views, such as any of the views associated with FIGS. 9A-9D, for example. In other words, the driver alert module 199 of the driver alert system 102 may force a view change or otherwise interrupt infotainment, for example, to provide a driver with a view of the surrounding environment or operating environment based on one or more steering inputs from a driver indicative of a possible lane change or other driving maneuver which may cause the vehicle 100 to cross paths with one or more obstacles. Examples of steering inputs indicative of an intent to change lanes, a potential lane change, or other similar driving maneuver may include signaling, using the turn signal switch 114, braking and/or drifting within a lane, providing a change in the steering angle, etc. In any event, the driver alert module 199 may change a mode of a user interface rendered on a display 158 of a vehicle 100, at least momentarily, while the vehicle is engaged or prior to engaging a corresponding driving maneuver, such as a lane change, for example.

In other embodiments, the driver alert module 199 of the driver alert system 102 may change the view of the UI based on a high driver alert level. In other words, when the driver alert level determination module 182 identifies a scenario where there is a likelihood of collision between the vehicle 100 and an obstacle, the driver alert module 199 may react or cause the UI to enter high alert mode, whereby one or more views provided by one or more of the cameras 126 are displayed on the display 158. For example, the views provided by FIGS. 9A-9D may be images received from one or more image capture devices, such as the right camera 130 or left camera 132 of the vehicle 100.

Figure 10:
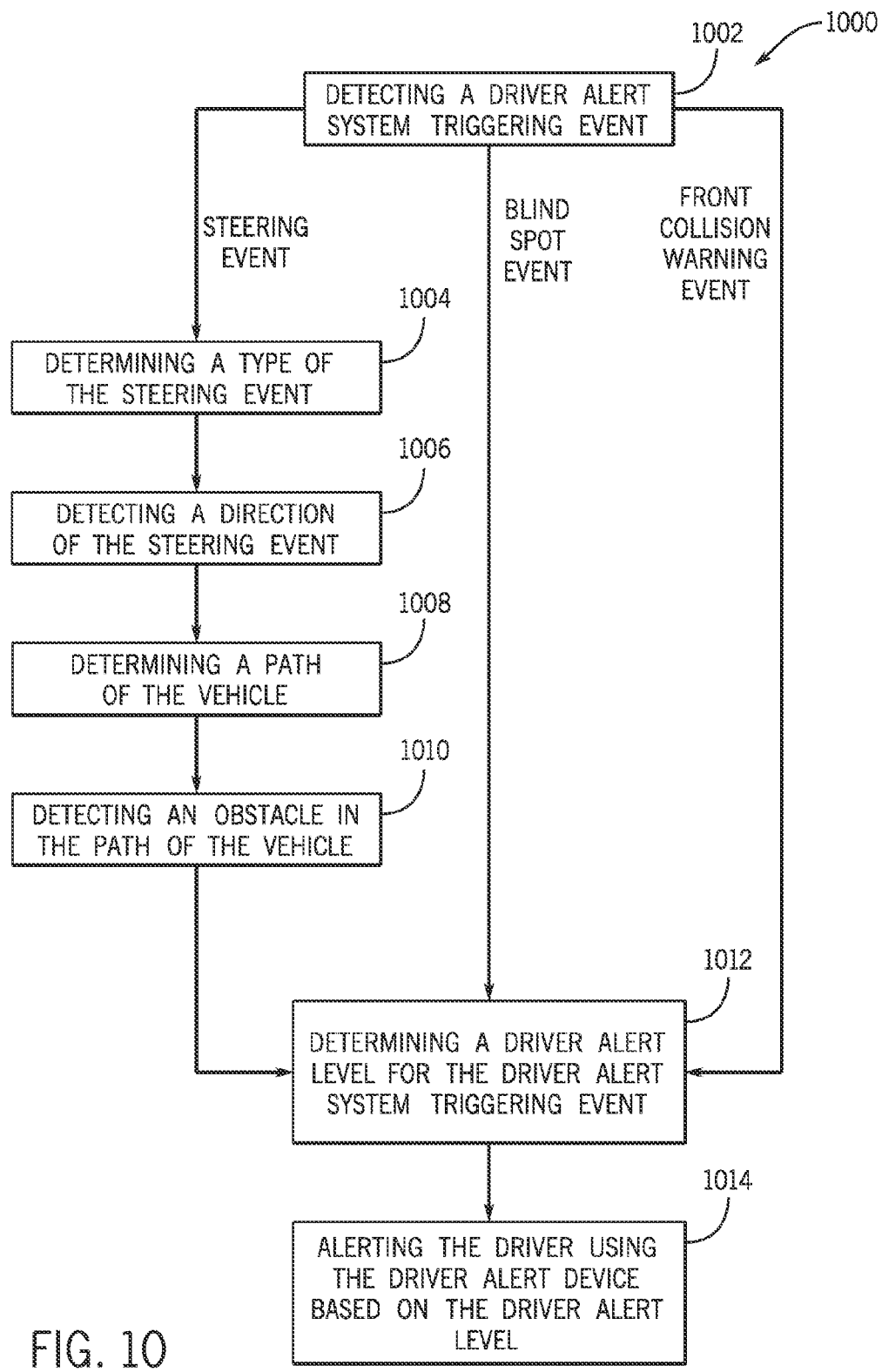
FIG. 10 is a process flow diagram for the driver alert system of FIG. 1 in accordance with an exemplary embodiment.

FIG. 10 is a process flow diagram for the driver alert system 102 of FIG. 1 in accordance with an exemplary embodiment of the present application. However, the driver alert method 1000 of FIG. 10 can also be used with other systems and embodiments besides those of FIG. 1, such as other vehicles 100 having a system that warns the driver of the vehicle 100 regarding the presence of obstacles 216 that can potentially collide with the vehicle 100.

At 1002, the driver alert method 1000 includes detecting a driver alert system triggering event. For example, the driver alert system triggering event can be detected using the alert system event detection module 172. As discussed, in one embodiment, the driver alert system triggering event can be at least one of the steering event, the blind spot event, and the front collision warning event.

The steering event can be detected using the steering event detection module 186 of the alert system event detection module 172 based on the output of the steering input sensor 194. The steering input sensor 194 can be at least one of the steering wheel torque sensor 110 and the steering wheel angular velocity sensor 112. The blind spot event can be detected using the blind spot event detection module 188 of the alert system event detection module 172 based on the output of at least one of the obstacle detection module 180, the obstacle detection sensor 106, and the turn signal switch 114. The front collision warning detection event can be detected using the front collision warning event detection module 190 of the alert system event detection module 172 based on the output of at least one of the vehicle speed sensor 124, the obstacle detection sensor 106, and the time to collision module 192. The obstacle detection sensor 106 can detect the presence of an obstacle in an alert zone of the vehicle 100, the vehicle speed sensor 124 can provide the speed of the vehicle 100, and the time to collision module 192 of the obstacle detection module 180 can provide the time to collision between the detected obstacle 216 and the vehicle 100.

At 1004, the driver alert method 1000 includes detecting a type of the steering event detected at 1002. For example, the type of steering event can be detected using the steering event determination module 174 based on at least the value of the output of at least one of the steering input sensor 194 measured a predetermined length of time after the driver alert system triggering event detected by the alert system event detection module 172. The output of the steering input sensor 194 can be the steering wheel angular velocity of a steering wheel of the vehicle 100. The steering wheel angular velocity can be provided as an output of the steering wheel angular velocity sensor 112.

At 1006, the driver alert method 1000 includes detecting a direction of the steering event detected at 1002. For example, the direction of the steering event can be detected using the steering event direction module 176 based on at least the output of the steering wheel angle polarity sensor 122. In one embodiment, the steering event direction module 176 can detect that the driver is steering the vehicle 100 to the right during the steering event, when the output of the steering wheel angle polarity sensor 122 indicates that the steering wheel is being rotated clockwise. The steering event direction module 176 can detect that the driver is steering the vehicle 100 to the left during the steering event, when the output of the steering wheel angle polarity sensor 122 indicates that the steering wheel is being rotated counterclockwise.

At 1008, the driver alert method 1000 includes determining a path of the vehicle 100. For example, the path of the vehicle 100 can be determined using the vehicle path determination module 178 based on the output from at least one of the steering input sensor 194, the yaw sensor 120, the steering wheel angle polarity sensor 122, and the vehicle speed sensor 124. Further, the vehicle path determination module 178 can determine the path of the vehicle 100 using the output from at least one of the steering wheel torque sensor 110, the steering wheel angular velocity sensor 112, the yaw sensor 120, the steering wheel angle polarity sensor 122, and the vehicle speed sensor 124.

At 1010, the driver alert method 1000 includes detecting an obstacle 216 in the path of the vehicle 100. For example, the obstacle 216 in the path of the vehicle 100 can be detected using the obstacle detection module 180 based on the output of at least one of the obstacle detection sensors 106. For example, the obstacle detection module 180 can detect an obstacle in an alert zone of the vehicle 100 using the output of at least one of the camera 126 and the radar unit 128. The obstacle detection module 180 can determine whether the detected obstacle 216 is in the path of the vehicle 100 using the output of the vehicle path determination module 178. Further, when the obstacle 216 is in the path of the vehicle 100, the time to collision module 192 can calculate the time to collision between the obstacle 216 and the vehicle 100 by determining a path of the obstacle 216, comparing the determined path of the obstacle 216 to the path of the vehicle 100 determined by the vehicle path determination module 178, and calculating the time at which the path of the vehicle 100 will cross the path of the obstacle 216 using at least the output of the throttle opening angle sensor 118 of the vehicle 100 and the output of the brake switch 108 of the vehicle 100.

At 1012, the driver alert method 1000 includes determining a driver alert level for the driver alert system triggering event detected at 1002. For example, the driver alert level determination module 182 can determine the driver alert level for the driver alert system triggering event detected at 1002 based on a comparison of a driver alert level value for the obstacle 216 detected in the alert zone 200 to a predetermined driver alert level threshold. The driver alert level value can be calculated by the driver alert level determination module using at least one of the range of the obstacle 216 from the vehicle 100 and the relative velocity of the obstacle 216. In one embodiment, the driver alert level determination module 182 determines that the driver alert level for the obstacle 216 is the high driver alert level, when the driver alert level value of the obstacle 216 is less than or equal to the predetermined driver alert level threshold. Further, the driver alert level determination module 182 determines that the driver alert level for the obstacle 216 is the low driver alert level, when the driver alert level value of the obstacle 216 is greater than the predetermined driver alert level threshold.

At 1014, the driver alert method 1000 includes alerting a driver of the vehicle 100 using a driver alert device 104 based on the driver alert level determined at 1012. For example, the driver alert device 104 of the driver alert system 102 can provide an alert to the driver regarding the occurrence of the driver alert system triggering event based on the driver alert level determined by the driver alert level determination module 182.

Thus, disclosed above are embodiments of the driver alert system 102 and the driver alert method 1000 for alerting the driver of the vehicle 100 to at least one of the occurrence of the driver alert system triggering event and the presence of the obstacle 216 in the alert zone 200 of the vehicle 100. The occurrence of the driver alert system triggering event can be determined using the steering event detection module 186 based on the angular velocity of the steering wheel and the torque applied to the steering wheel by the driver. The type of steering event can be determined using the steering event determination module 174 based on the angular velocity of the steering wheel measured a predetermined amount of time after the occurrence of the driver alert system triggering event, where the length of the predetermined amount of time is based on the speed of the vehicle 100 at the time of the occurrence of the driver alert system triggering event.

Figure 11:
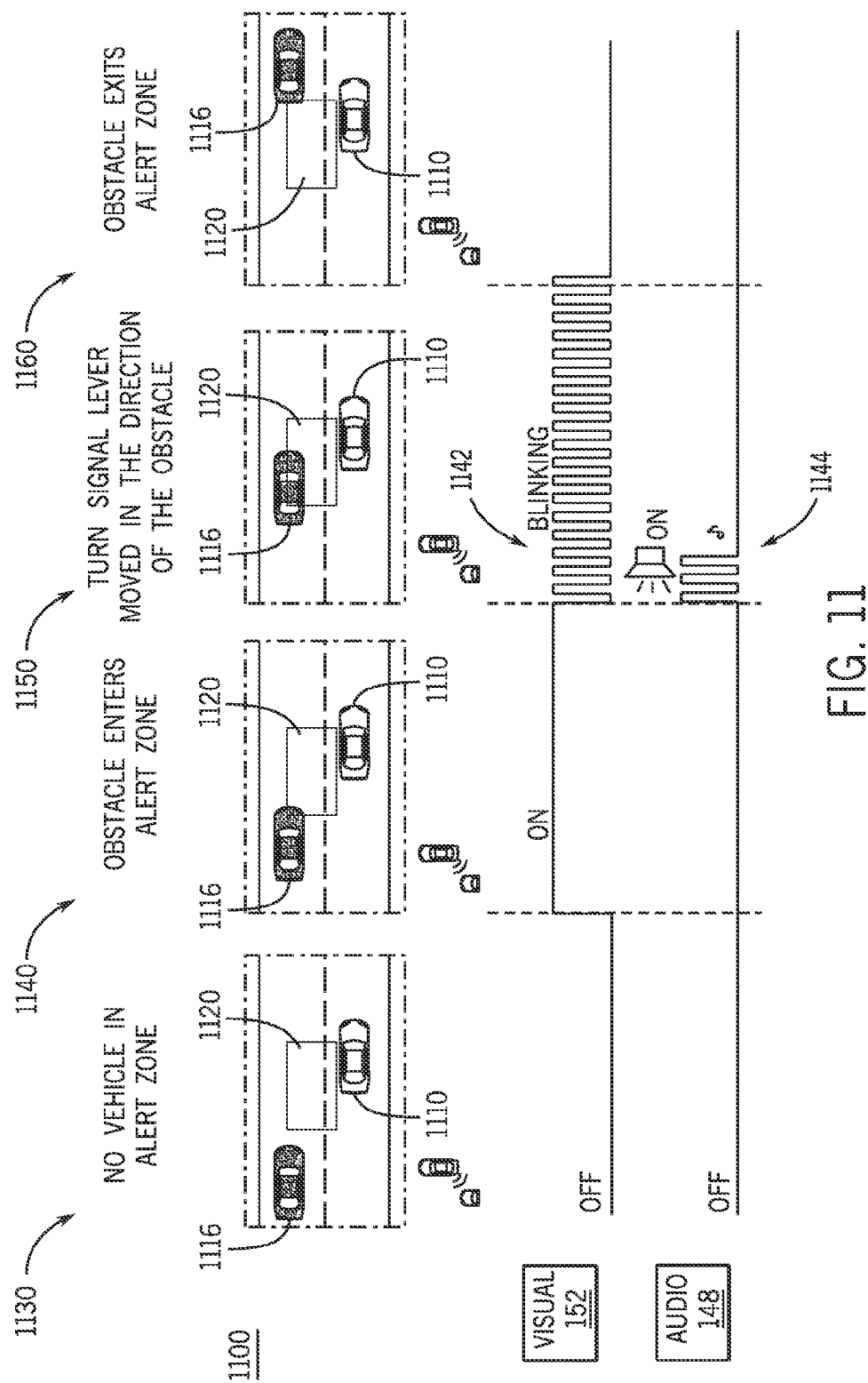
FIG. 11 is a diagram of an example scenario of a vehicle equipped with a system for alerting a driver or driver alert system, according to one or more embodiments.

Regardless, the components, sensors, or devices of FIG. 1 may operate to provide a driver of a vehicle with one or more alerts in a variety of different scenarios. FIG. 11 is a diagram 1100 of an example scenario of a vehicle equipped with a system for alerting a driver or driver alert system. Here, in this example, the driver alert system of the vehicle 1110 may include an obstacle detection sensor 106 for sensing or detecting one or more obstacles in one or more alert zones, such as alert zone 1120. At a first time 1130, the vehicle 1110 may be travelling and traffic (e.g., vehicle or obstacle 1116) may be travelling alongside the vehicle 1110, but not within any alert zones 1120. In this scenario, multiple driver alert devices 104 may be implemented. For example, an audio alert device 148 and a visual alert device 152 may be utilized in combination. Here, because no obstacle 1116 is present in the alert zone 1120, both the audio alert device 148 and the visual alert device 152 are off or deactivated.

At a second time 1140, such as when the vehicle 1110 slows down, when the obstacle 1116 speeds up, or otherwise enters at least a portion of the alert zone 1120, the visual alert device 152 may be turned on or activated by the driver alert system. In other words, an indicator LED, such as LED 160, may be turned on to alert a driver that space adjacent to the vehicle 1110 is occupied. Here, at the second time 1140, the audio alert device 148 may remain inactive or deactivated, since the driver has not provided any indication (e.g., activating a turn signal switch 114, turning the steering wheel, or providing other types of steering input to the steering input sensor 194) that he or she is considering changing lanes to the lane where the obstacle 1116 is currently located. Further, the driver alert module 199 may have the visual display device 152 change a mode of a display 158 to a view associated with a left camera 132 of a vehicle in response to the obstacle 1116 being present in the alert zone 1120 or based on a driver alert level associated with the obstacle 1116.

At a third time 1150, while the obstacle 1116 is still present in the alert zone 1120, if the driver of the vehicle provides one or more steering inputs to the vehicle 1110 which indicate that he or she intends to move in the direction of the obstacle 1116, such as by activating the turn signal switch 114 to signal for a left turn or a left lane change or by changing the steering angle or steering wheel angle polarity, the audio alert device 148 and the visual alert device 152 may be set to a high alert mode. As a result, the visual alert device 152 may provide a flashing indication (e.g., as seen at 1142) while the audio alert device 148 may provide a pulsing audio notification, as seen at 1144. Further, the flashing indication associated with 1142 may be implemented by flashing an area of a display 158, such as the border 904 of FIG. 9, for example. In other words, when the scenario associated with 1150 is occurring, the user interface or display 158 may present a corresponding view, such as the view seen in FIG. 9C or 9D where the border 904a is flashing, glowing, changes colors or attributes, etc. based on the presence of an obstacle (e.g., 216 in FIG. 9 or 1116 in FIG. 11) and an indication that the driver intends to turn (e.g., activation of turn signal switch 114 or changing of steering wheel angle polarity via sensor 122, etc.).

In other embodiments, one or more devices of the driver alert device 104, such as the audio alert device 148 or the visual alert device 152 may be set to a high alert mode when the driver of the vehicle provides one or more steering inputs to the vehicle 1110 which indicate that he or she intends to move in the direction of an obstacle which is not yet in the alert zone 1120. For example, if the obstacle 1116 is approaching at a high rate of speed relative to the speed of the vehicle 1110, the driver alert level determination module 182 may place the system at a high driver alert level, thereby causing the visual alert device 152 to provide a flashing indication and the audio alert device 148 to provide a pulsing audio notification even when no obstacle is currently in the alert zone 1120.

At a fourth time 1160, when the obstacle leaves the alert zone 1120, the audio alert device 148 and the visual alert device 152 may be disabled. In one or more embodiments, the obstacle detection sensor 106 may track an obstacle, such as obstacle 1116, and disable one or more of the driver alert devices 104 in scenarios where the same obstacle enters and leaves the alert zone 1120 repeatedly, such as when a variation in speed occurs between vehicles travelling alongside one another.

FIGS. 12A-C are diagrams of an example scenarios 1200A, 1200B, and 1200C of a vehicle equipped with a system 102 for alerting a driver or driver alert system, according to one or more embodiments. In FIG. 12A, a view 1200A associated with one or more aspects of a driver alert system 102 is presented. Here, the view 1200A of FIG. 12A may include a left camera feed 1210, a right camera feed 1220, and information panel 1230. One or more of the camera feeds 1210 or 1220 may include one or more areas, such as borders 1212 and 1222, respectively. The driver alert module 199 may adjust or change the color of borders 1212 and 1222 based on proximity of one or more corresponding obstacles on the left and right sides of the vehicle equipped with the driver alert system 102.

For example, the left camera feed 1210 may have a green border 1212 because no obstacles appear present or within a predetermined range of the left side of the vehicle. Distance markers or proximity markers 1214 and 1216 may be presented and be colored differently based on representative distances, respectively. On the other hand, the right camera feed 1220, may have a different color border 1222

(e.g., yellow or red, etc.) based on the distance that obstacle 216 is from the vehicle or whether the obstacle 216 is located within a corresponding blind spot on the right side of the vehicle or within a proximity indicated by proximity markers 1234 or 1236. Here, in this example, because the obstacle 216 is located within a predefined portion of an alert zone, such as a blind spot or at proximity marker 1236, indicator icon 1224 is presented within the display 158, and may flash, or be accompanied by audio from the audio alert device 148. Further, the indicator icon 1224 may appear on a right side of the display when the obstacle 216 is on the right side of the vehicle. In one or more embodiments, the indicator icon 1224 may appear or be rendered by the display 158 merely when obstacle(s) 216 are present within an alert zone. In other embodiments, the indicator icon 1224 may be rendered when obstacles 216 are detected, but not yet present in the alert zone. Here, in these example embodiments, the indicator icon 1224 may change color, flash, be accompanied by audio alerts, etc. once the obstacle enters the alert zone, for example.

In FIG. 12B, when the driver of the vehicle initiates a right turn or signals for a right turn using the turn signal switch 114, the right camera feed 1220a is presented in a zoomed in view 1200B, having border 1222a, which may be colored based on the proximity or other attributes of the obstacle 216a, and having indicator icon 1224 to alert the driver that the obstacle 216 is present somewhere to the right (and possibly behind) the vehicle. In FIG. 12B, the right camera feed 1220a is the camera feed 1220 from FIG. 12A at the instant when the driver signals for a right turn or initiates a right lane change maneuver. Here, the information panel 1230 is moved or rearranged accordingly, although, in some embodiments, the camera feed is positioned closer to the driver, such as on the left, for example.

In FIG. 12C, when the driver of the vehicle initiates a left turn or signals for a left turn using the turn signal switch 114, the left camera feed 1210a is presented in a zoomed in view 1200C, having border 1212a, which may be colored (e.g., such as green or yellow in this case, because the obstacle 216b is farther from the vehicle than obstacle 216a of FIG. 12B) based on the proximity or other attributes of the obstacle 216a, and having indicator icon 1250a to alert the driver that the obstacle 216b is present somewhere to the left (and possibly behind) the vehicle. Because the obstacle 216b is detected on the left of the vehicle, the display 158 may render the indicator icon 1250a on the left side of the display 158. Accordingly, the display 158 may render a video feed from a camera based on a driver alert level and superimpose one or more indicator icons (e.g., 1224 or 1250a) based on positions of one or more obstacles (e.g., 216 or 216b). In FIG. 12C, the left camera feed 1210a is similar to the camera feed 1210 from FIG. 12A, except for the presence of the obstacle 216b. The information panel 1230b may be moved or rearranged accordingly in a similar fashion to FIG. 12B.

In one or more embodiments, different regions or areas may be utilized or colored to represent different aspects or attributes of an obstacle. For example, a first region or border may represent a distance or proximity an obstacle is from a vehicle, while a second region or border may represent a time to collision or relative velocity that obstacle has with respect to the vehicle. Accordingly, FIGS. 13A-C are diagrams of an example scenarios 1300A, 1300B, and 1300C of a vehicle equipped with a system 102 for alerting a driver or driver alert system, according to one or more embodiments.

Figure 13A:
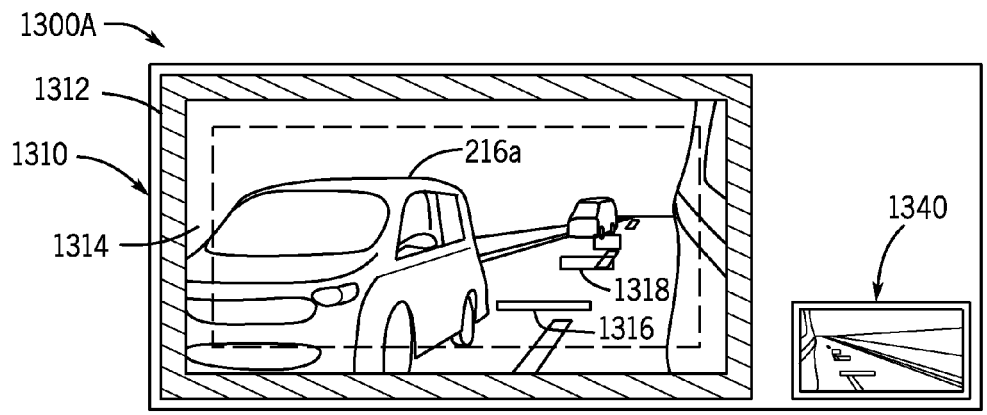
FIGS. 13A-C are diagrams of an example scenario of a vehicle equipped with a system for alerting a driver or driver alert system, according to one or more embodiments.

In FIG. 13A, at 1300A, an obstacle 216a is near the vehicle (e.g., past proximity indicator 1318 and within proximity indicator 1316), travelling at a high relative velocity (e.g., greater than a relative velocity threshold). Thus, in this scenario 1310, a first region 1312 may be colored red to indicate the close proximity of the obstacle 216a, and a second region 1314 may be colored pink to indicate the high relative velocity of the obstacle 216a (e.g., greater than a 20 mph difference between the obstacle 216a and the vehicle, etc.). Here, right camera feed 1340 may be miniaturized because no obstacles are present or because obstacles in the right camera feed are associated with a lesser degree of a driver alert level.

In one or more embodiments, the driver alert module 199 may select color schemes for the first region 1312 and the second region 1314 such that respective regions will not have the same color, thereby enabling a driver or other occupant of the vehicle to better distinguish between the two regions. In other words, if the driver alert module 199 made it possible to have region 1312 and region 1314 be the same shade or color, such as the same shade of red, drivers would not necessarily be able to distinguish between the two regions or recognize the two regions. In other embodiments, the driver alert module 199 may enable the two regions to have the same color scheme, but utilize bordering or other effects to help a driver distinguish between the two regions 1312 and 1314.

Figure 13B:
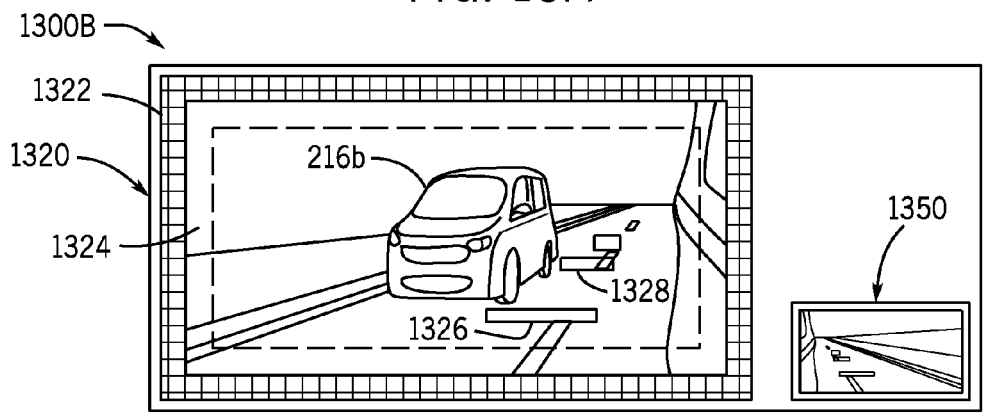
Figure 13C:
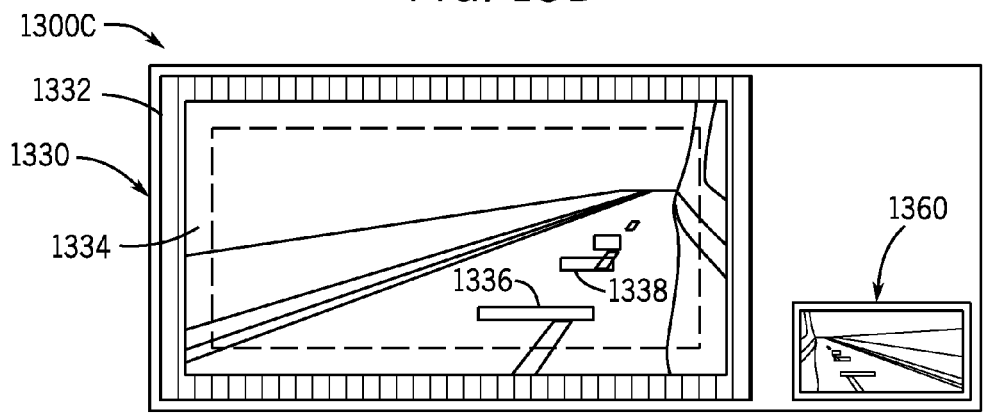

In FIG. 13B, at 1300B, an obstacle 216b is farther away from the vehicle than the obstacle 216a of FIG. 13A (e.g., closer to proximity indicator 1328 and near proximity indicator 1326), and travelling at a relative velocity less than a relative velocity threshold. Thus, in this scenario 1320, a first region 1322 may be colored yellow to indicate the proximity of the obstacle 216b, and a second region 1324 may be colored orange to indicate the relative velocity of the obstacle 216b being less than the relative velocity of the obstacle 216a of FIG. 13A. Again, the right camera feed 1350 may be miniaturized because no obstacles are present or detected on the right.

In FIG. 13C, at 1300C, no obstacles are detected near the vehicle (e.g., near proximity indicators 1336 and 1338) on the left, and thus no corresponding velocity is detected. Therefore, in this scenario 1330, a first region 1332 may be colored green to indicate no obstacles, and a second region 1334 may be colored light green, clear, or not colored to indicate no an obstacle is detected. Again, right camera feed 1360 may be miniaturized because no obstacles are detected on the right. Here, the view of the left camera feed may be zoomed because a left turn signal is activated using the turn signal switch 114 or a left lane change maneuver is initiated by changing the steering angle (e.g., detected by steering angle polarity sensor 122).

Figure 14A:
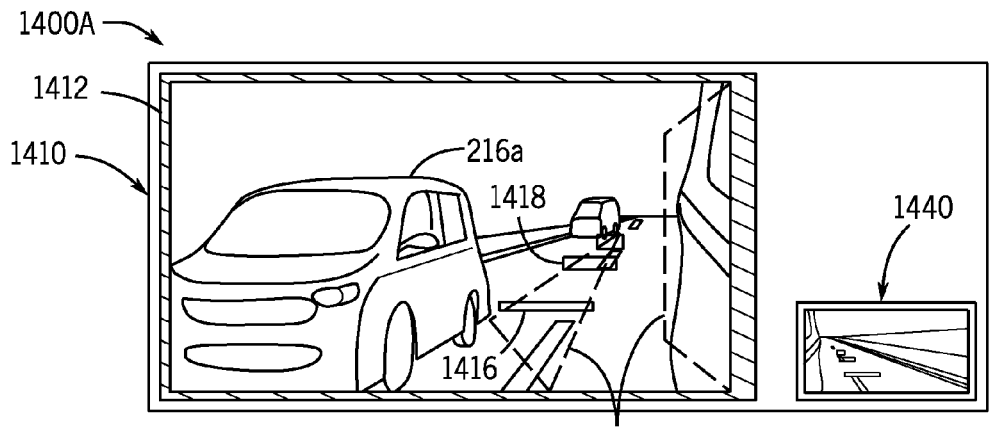
FIGS. 14 A-C are diagrams of an example scenario of a vehicle equipped with a system for alerting a driver or driver alert system, according to one or more embodiments.
Figure 14B:
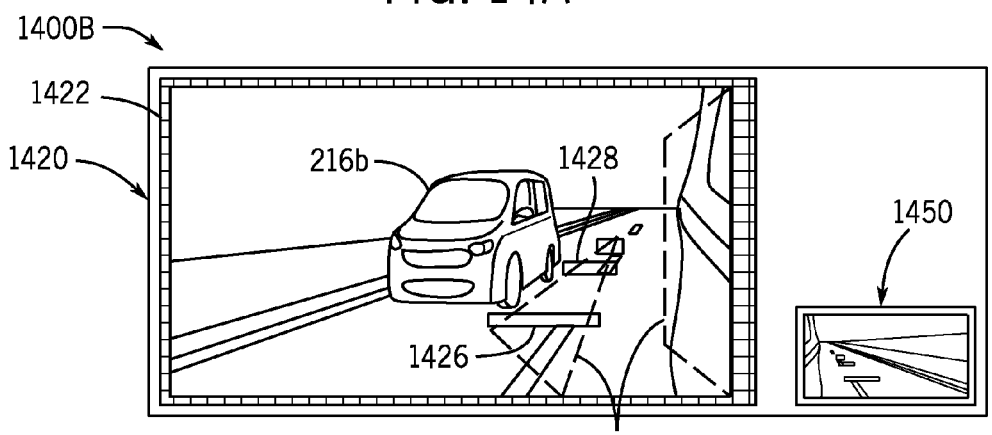
Figure 14C:
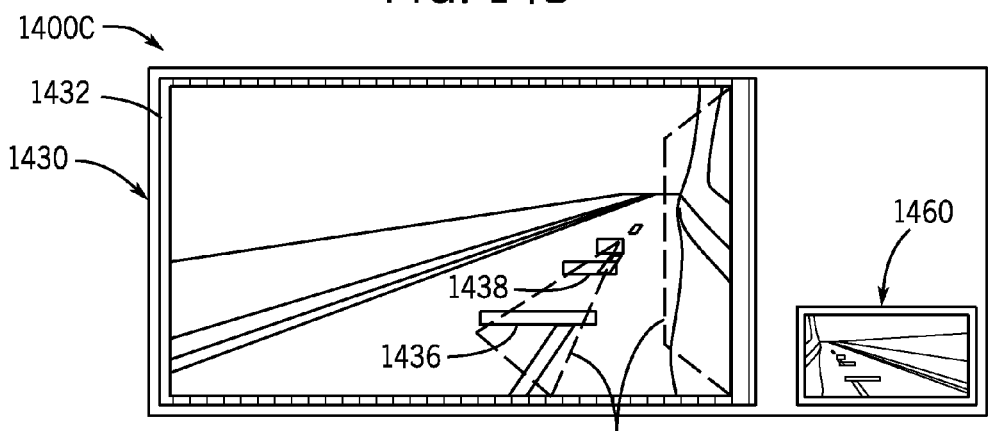

FIGS. 14A-C are diagrams of an example scenarios 1400A, 1400B, and 1400C of a vehicle equipped with a system 102 for alerting a driver or driver alert system, according to one or more embodiments. FIGS. 14A, 14B, and 14C illustrate different embodiments corresponding to FIGS. 13A, 13B, and 13C, except that the second regions 1314, 1324, and 1334 are implemented as indicator regions 1414, 1424, and 1434, rather than as borders.

In FIG. 14A, at 1400A, an obstacle 216a is near the vehicle (e.g., past proximity indicator 1418 and within proximity indicator 1416), travelling at a high relative velocity (e.g., greater than a relative velocity threshold). Thus, in this scenario 1410, a first region 1412 may be colored red to indicate the close proximity of the obstacle 216a, and a second region 1414 may be colored based on the relative velocity of the obstacle 216a. Here, right camera feed 1440 may be miniaturized because no obstacles are present or because obstacles in the right camera feed are associated with a lesser degree of a driver alert level.

In FIG. 14B, at 1400B, an obstacle 216b is farther away from the vehicle than the obstacle 216a of FIG. 14A (e.g., closer to proximity indicator 1428 and near proximity indicator 1426), and travelling at a relative velocity less than a relative velocity threshold. Thus, in this scenario 1420, a first region 1422 may be colored yellow to indicate the proximity of the obstacle 216b, and a second region 1424 may be colored based on a driver alert level associated with the obstacle 216b. The right camera feed 1450 may be miniaturized because no obstacles are present or detected on the right.

In FIG. 14C, at 1400C, no obstacles are detected near the vehicle (e.g., near proximity indicators 1436 and 1438) on the left. In scenario 1430, a first region 1432 may be colored green to indicate no obstacles, and a second region 1434 may be colored using a similar color scheme to indicate no an obstacle is detected. Right camera feed 1460 may be miniaturized because no obstacles are detected on the right. A camera feed may be zoomed in based on activation of a corresponding turn signal switch 114 or lane change maneuver (e.g., detected by steering angle polarity sensor 122 or other steering input sensor 194).

Figure 15:
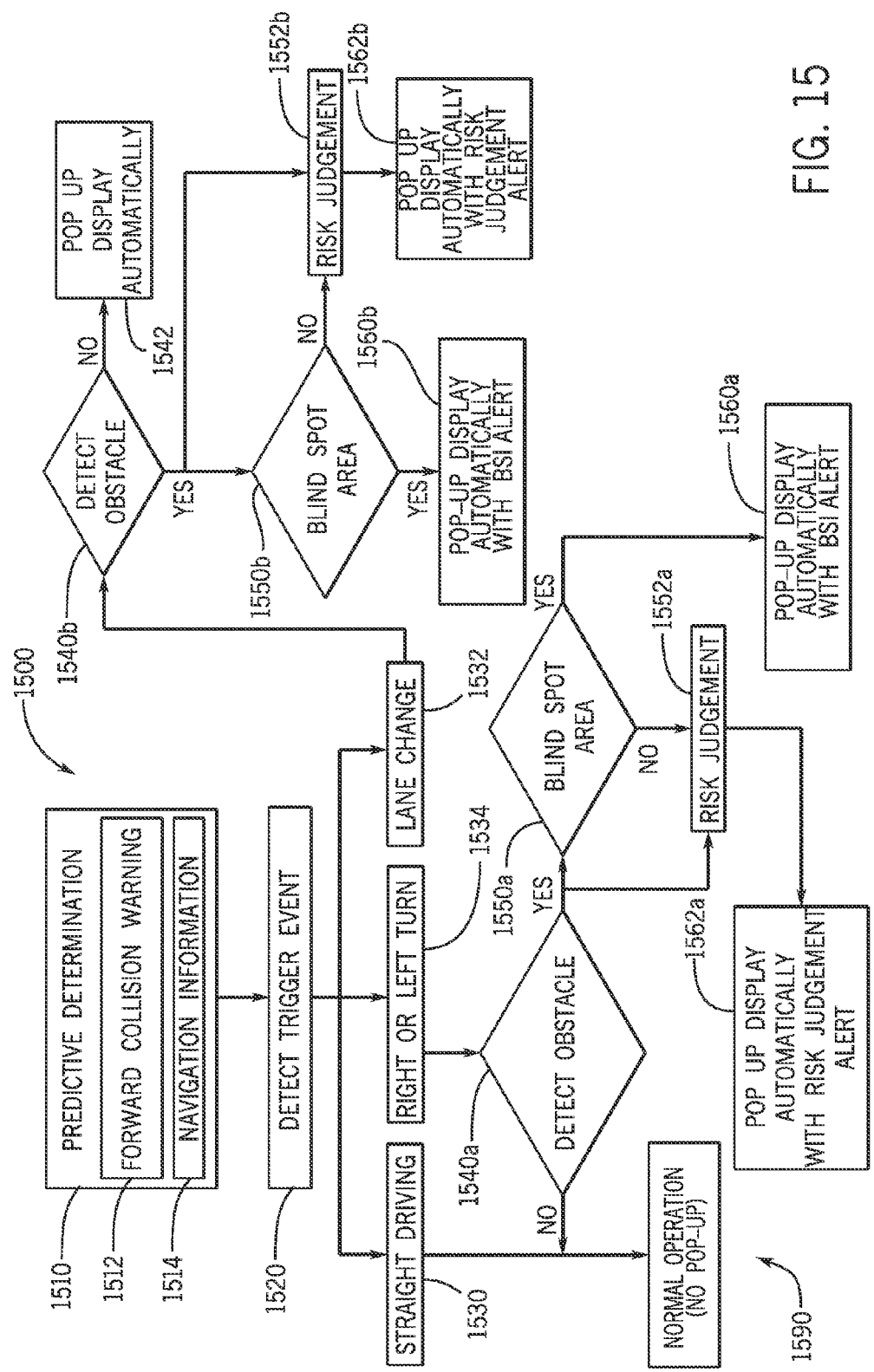
FIG. 15 is a flow diagram of a method for alerting a driver, according to one or more embodiments.

FIG. 15 is a flow diagram of a method 1500 for alerting a driver, according to one or more embodiments. At 1510, one or more predictive determinations may be made with regard to a path of a vehicle and a path of an obstacle. Navigation information 1514 and forward collision warning information 1512 may be utilized to facilitate such predictions or estimated paths. At 1520, one or more trigger events may be detected. Trigger events may include blind spot events, steering events, or collision events. Effectively, the trigger events 1520 of the method 1500, when detected, cause a display, such as display 158 of FIG. 1 to change a mode of a display to a driver assisted view, such as a view presented in FIGS. 12A-C or FIGS. 9A-C, for example. Such views may include one or more indicator icons which are indicative of the presence of an obstacle. Further, the position of an indicator icon may be determined or rendered based on the position of the obstacle. In other words, when an obstacle is detected on the left side of a vehicle, the indicator icon may be rendered on the left side of a display, etc.

Depending of the type of driving event, presence of an obstacle, location of an obstacle, and an associated risk assessment or driver alert level, different views may be presented or rendered on the display 158. For example, when a straight driving event 1530 is detected, the driver alert module 199 may set the mode of the display 158 to a normal operation mode 1590. In normal operation mode 1590, a view of the display 158 is maintained such that no pop ups are enabled and no driver assisted views or the like are presented.

When a turn event, such as a right turn or left turn is detected 1534, the obstacle detection sensor 106 may determine whether one or more obstacles are present 1540a. If no obstacles are present, the driver alert module 199 may set the mode of the display 158 to a normal operation mode 1590. If obstacles are detected, the obstacle detection sensor 106 may determine whether the obstacles are within an alert zone or a blind spot area 1550a. If the obstacle is not within the blind spot area, a risk judgment 1552a or risk assessment may be performed (e.g., relative velocity or absolute velocity of the obstacle), etc.

In one or more embodiments, the risk judgment 1552a may be performed without assessing whether the obstacle is in the blind spot area 1550a or regardless of the assessment. If the risk judgment 1552a is associated with a high driver alert level or a threshold driver alert level, the driver alert module 199 may set the mode of the display 158 to automatically change modes to a display a driver assisted view or automatically pop up an indicator associated with the risk judgment alert 1562a. For example, if an obstacle is travelling at a high rate of speed on a roadway which a vehicle is turning onto, such a pop up or risk judgment alert 1562a may be presented on the display 158. Similarly, if the obstacle is determined to be located in a blind spot or alert zone, the driver alert module 199 may set the mode of the display 158 to display a driver assisted view or automatically pop up with or having a blind spot indicator (BSI) or indicator icon 1560a, such as indicator icon 1224 or 1250a of FIG. 12C.

When a lane change event is detected 1532, the obstacle detection sensor 106 may determine whether one or more obstacles are present 1540b. If no obstacles are present, the driver alert module 199 may set the mode of the display 158 to a driver assisted view 1542 which pops up a display automatically. If obstacles are detected, the obstacle detection sensor 106 may determine whether the obstacles are within an alert zone or a blind spot area 1550b. If the obstacle is not present within the blind spot area, a risk judgment 1552b or risk assessment may be performed (e.g., determined or based on relative velocity or absolute velocity of the obstacle), etc.

In one or more embodiments, the risk judgment 1552b may be performed without assessing whether the obstacle is in the blind spot area 1550b or regardless of the assessment. If the risk judgment 1552b is associated with a high driver alert level or a threshold driver alert level, the driver alert module 199 may set the mode of the display 158 to automatically change modes to a display a driver assisted view or automatically pop up an indicator associated with the risk judgment alert 1562b or pop up alert. Similarly, if the obstacle is determined to be located in a blind spot or alert zone, the driver alert module 199 may set the mode of the display 158 to display a driver assisted view or automatically pop up with a blind spot indicator (BSI) or indicator icon 1560b, such as indicator icon 1224 or 1250a of FIG. 12C.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A method for operating a driver alert system for a vehicle, the method comprising:
    detecting a driver alert system triggering event, wherein the driver alert system triggering event is at least one of a steering event, a blind spot event, and a front collision warning event;
    determining a driver alert level for the driver alert system triggering event;
    alerting a driver of the vehicle using a driver alert device based on the driver alert level;
    determining a type of the steering event, wherein the type of steering event is at least one of a straight driving event, a turn event, and a lane change event;
    detecting a direction of the steering event;
    determining a path of the vehicle; and
    detecting an obstacle in the path of the vehicle, wherein the driver alert level is based on a relative velocity of the obstacle.

2. The method of claim 1, wherein the driver alert system triggering event is detected using at least one of a steering input sensor, a camera, and a radar unit;
    wherein the steering event type is determined based on a value of an output of the steering input sensor measured a predetermined length of time after the driver alert system triggering event, wherein the predetermined length of time is determined by a speed of the vehicle at the driver alert system triggering event; and
    wherein the obstacle is at least one of a vehicle, a bicycle, and a human.

3. The method of claim 2, wherein the predetermined length of time after the driver alert system triggering event increases as the speed of the vehicle at the driver alert system triggering event increases,
    wherein the predetermined length of time is equal to a first predetermined length of time, when the speed of the vehicle at the driver alert system triggering event is within a first speed range;
    the predetermined length of time is equal to a second predetermined length of time, when the speed of the vehicle at the driver alert system triggering event is within a second speed range;
    the predetermined length of time is equal to a third predetermined length of time, when the speed of the vehicle at the driver alert system triggering event is within a third speed range; and
    the predetermined length of time is equal to a fourth predetermined length of time, when the speed of the vehicle at the driver alert system triggering event is within a fourth speed range;
    wherein the output of the steering input sensor is a steering wheel angular velocity of a steering wheel of the vehicle;
    wherein the steering event type is the straight driving event, when the speed of the vehicle at the driver alert system triggering event is within the first predetermined vehicle speed range and the steering wheel angular velocity is within a first predetermined steering wheel angular velocity range;
    the steering event type is the lane change event, when the speed of the vehicle at the driver alert system triggering event is within the first predetermined vehicle speed range and the steering wheel angular velocity is within a second predetermined steering wheel angular velocity range;
    the steering event type is the turn event, when the speed of the vehicle at the driver alert system triggering event is within the first predetermined vehicle speed range and the steering wheel angular velocity is within a third predetermined steering wheel angular velocity range;
    wherein the steering event type is the straight driving event, when the speed of the vehicle at the driver alert system triggering event is within the second predetermined vehicle speed range and the steering wheel angular velocity is within a fourth predetermined steering wheel angular velocity range;
    the steering event type is the lane change event, when the speed of the vehicle at the driver alert system triggering event is within the second predetermined vehicle speed range and the steering wheel angular velocity is within a fifth predetermined steering wheel angular velocity range;
    the steering event type is a turn event, when the speed of the vehicle at the driver alert system triggering event is within the second predetermined vehicle speed range and the steering wheel angular velocity is within a sixth predetermined steering wheel angular velocity range;
    wherein the steering event type is the straight driving event, when the speed of the vehicle at the driver alert system triggering event is within the third predetermined vehicle speed range and the steering wheel angular velocity is within a seventh predetermined steering wheel angular velocity range;
    the steering event type is the lane change event, when the speed of the vehicle at the driver alert system triggering event is within the second predetermined vehicle speed range and the steering wheel angular velocity is within an eighth predetermined steering wheel angular velocity range;
    the steering event type is the turn event, when the speed of the vehicle at the driver alert system triggering event is within the third predetermined vehicle speed range and the steering wheel angular velocity is within a ninth predetermined steering wheel angular velocity range; and
    wherein the steering event type is the straight driving event, when the speed of the vehicle at the driver alert system triggering event is within the fourth predetermined vehicle speed range and the steering wheel angular velocity is within a tenth predetermined steering wheel angular velocity range;
    the steering event type is the lane change event, when the speed of the vehicle at the driver alert system triggering event is within the fourth predetermined vehicle speed range and the steering wheel angular velocity is within an eleventh predetermined steering wheel angular velocity range.

4. The method of claim 3, wherein the first predetermined length of time is about one second and the first predetermined vehicle speed range includes speed values that are both greater than or equal to about 10 kph and less than or equal to about 20 kph;
    the second predetermined length of time is about 0.8 seconds and the second predetermined vehicle speed range includes speed values that are both greater than or equal to about 21 kph and less than or equal to about 35 kph;
    the third predetermined length of time is about 0.5 seconds and the third predetermined vehicle speed range includes speed values that are both greater than or equal to about 36 kph and less than or equal to about 55 kph; and the fourth predetermined length of time is about 0.2 seconds and fourth predetermined vehicle speed range includes speed values that are greater than or equal to about 56 kph;

wherein the first predetermined steering wheel angular velocity range is steering wheel angular velocity values that are less than or equal to about 6 deg/s, the second predetermined steering wheel angular velocity range includes steering wheel angular velocity values that are both greater than or equal to about 7 deg/s and less than or equal to about 70 deg/s, the third predetermined steering wheel angular velocity range includes steering wheel angular velocity values that are greater than or equal to about 71 deg/s, the fourth predetermined steering wheel angular velocity range includes steering wheel angular velocity values that are less than or equal to about 6 deg/s, the fifth predetermined steering wheel angular velocity range includes steering wheel angular velocity values that are both greater than or equal to about 7 deg/s and less than or equal to about 50 deg/s, the sixth predetermined steering wheel angular velocity range includes steering wheel angular velocity values that are greater than or equal to 51 deg/s, the seventh predetermined steering wheel angular velocity range includes steering wheel angular velocity values that are less than or equal to about 6 deg/s, the eighth predetermined steering wheel angular velocity range includes steering wheel angular velocity values that are both greater than or equal to about 7 deg/s and less than or equal to about 30 deg/s, the ninth predetermined steering wheel angular velocity range includes steering wheel angular velocity values that are greater than or equal to about 31 deg/s, the tenth predetermined steering wheel angular velocity range includes steering angle values that are less than or equal to about 10 deg/s, and the eleventh predetermined steering wheel angular velocity range includes steering angle values that are greater than or equal to about 11 deg/s.

5. The method of claim 1, wherein the output of the steering input sensor is at least one of a steering wheel angular velocity of a steering wheel of the vehicle and a torque applied to the steering wheel of the vehicle;

wherein the steering event occurs when the steering wheel angular velocity is greater than or equal to a steering wheel angular velocity steering event threshold, and the torque applied to the steering wheel of the vehicle is greater than or equal to a steering wheel torque steering event threshold;

wherein determining the driver alert level includes:
calculating a driver alert level value, and
comparing the driver alert level value to a predetermined driver alert threshold value;

wherein the driver alert level value is calculated using at least one of a range of the obstacle and the relative velocity of the obstacle;

wherein the driver alert level is low, when the driver alert value exceeds the predetermined alert threshold, and the driver alert level is high, when the driver alert value is less than or equal to the predetermined alert threshold;

wherein the steering wheel angular velocity steering event threshold is 10 deg/s and the steering wheel torque steering event threshold is 1 Nm.

6. The method of claim 1, wherein the driver alert device produces at least one of a visual alert device, an audio alert device, and a tactile alert device.

7. The method of claim 6, wherein the visual alert device is a display having a border and a size, wherein a color of the border is determined by the driver alert level and the size of the display is determined by an intent of a driver to move the vehicle into a lane shown in the display;

wherein the audio alert device is at least one of a speaker for producing an audio alert in the vehicle, the audio alert having at least one of a location, a duration, and an intensity, wherein the at least one of the duration, the location, and the intensity of the audio alert varies based on the driver alert level and the location of the obstacle; and wherein the tactile alert device is a steering wheel vibrator for vibrating the steering wheel of the vehicle.

8. A non-transitory computer readable storage medium storing executable code for a driver alert system for a vehicle, the code when executed by a processor performs actions comprising:

detecting a driver alert system triggering event, wherein the driver alert system triggering event is at least one of a steering event, a blind spot event, and a front collision warning event;

determining a driver alert level for the driver alert system triggering event;

alerting a driver of the vehicle using a driver alert device based on the driver alert level;

determining a type of the steering event, wherein the type of steering event includes at least one of a straight driving event, a turn event, and a lane change event;

detecting a direction of the steering event;

determining a path of the vehicle; and detecting an obstacle in the path of the vehicle, wherein the driver alert level is based on a relative velocity of the obstacle.

9. The non-transitory computer-readable storage medium of claim 8, wherein the driver alert system triggering event is detected using at least one of a steering input sensor, a camera, and a radar unit, wherein the steering event type is determined based on a value of an output of the steering input sensor measured a predetermined length of time after the driver alert system triggering event, wherein the predetermined length of time is determined by a speed of the vehicle at the driver alert system triggering event; and wherein the obstacle includes at least one of a vehicle, a bicycle, and a human.

10. The non-transitory computer-readable storage medium of claim 9, wherein the predetermined length of time after the driver alert system triggering event increases as the speed of the vehicle at the driver alert system triggering event increases, wherein the predetermined length of time is equal to a first predetermined length of time, when the speed of the vehicle at the driver alert system triggering event is within a first speed range;

the predetermined length of time is equal to a second predetermined length of time, when the speed of the vehicle at the driver alert system triggering event is within a second speed range;

the predetermined length of time is equal to a third predetermined length of time, when the speed of the vehicle at the driver alert system triggering event is within a third speed range; and the predetermined length of time is equal to a fourth predetermined length of time, when the speed of the vehicle at the driver alert system triggering event is within a fourth speed range;

wherein the output of the steering input sensor is a steering wheel angular velocity of a steering wheel of the vehicle;

wherein the steering event type is the straight driving event, when the speed of the vehicle at the driver alert system triggering event is within the first predetermined vehicle speed range and the steering wheel angular velocity is within a first predetermined steering wheel angular velocity range;

the steering event type is the lane change event, when the speed of the vehicle at the driver alert system triggering event is within the first predetermined vehicle speed range and the steering wheel angular velocity is within a second predetermined steering wheel angular velocity range;

the steering event type is the turn event, when the speed of the vehicle at the driver alert system triggering event is within the first predetermined vehicle speed range and the steering wheel angular velocity is within a third predetermined steering wheel angular velocity range;

wherein the steering event type is the straight driving event, when the speed of the vehicle at the driver alert system triggering event is within the second predetermined vehicle speed range and the steering wheel angular velocity is within a fourth predetermined steering wheel angular velocity range;

the steering event type is the lane change event, when the speed of the vehicle at the driver alert system triggering event is within the second predetermined vehicle speed range and the steering wheel angular velocity is within a fifth predetermined steering wheel angular velocity range;

the steering event type is a turn event, when the speed of the vehicle at the driver alert system triggering event is within the second predetermined vehicle speed range and the steering wheel angular velocity is within a sixth predetermined steering wheel angular velocity range;

wherein the steering event type is the straight driving event, when the speed of the vehicle at the driver alert system triggering event is within the third predetermined vehicle speed range and the steering wheel angular velocity is within a seventh predetermined steering wheel angular velocity range;

the steering event type is the lane change event, when the speed of the vehicle at the driver alert system triggering event is within the second predetermined vehicle speed range and the steering wheel angular velocity is within an eighth predetermined steering wheel angular velocity range;

the steering event type is the turn event, when the speed of the vehicle at the driver alert system triggering event is within the third predetermined vehicle speed range and the steering wheel angular velocity is within a ninth predetermined steering wheel angular velocity range; and wherein the steering event type is the straight driving event, when the speed of the vehicle at the driver alert system triggering event is within the fourth predetermined vehicle speed range and the steering wheel angular velocity is within a tenth predetermined steering wheel angular velocity range; the steering event type is the lane change event, when the speed of the vehicle at the driver alert system triggering event is within the fourth predetermined vehicle speed range and the steering wheel angular velocity is within an eleventh predetermined steering wheel angular velocity range.

11. The non-transitory computer-readable storage medium of claim 10, wherein the first predetermined length of time is about one second and the first predetermined vehicle speed range includes speed values that are both greater than or equal to about 10 kph and less than or equal to about 20 kph;

the second predetermined length of time is about 0.8 seconds and the second predetermined vehicle speed range includes speed values that are both greater than or equal to about 21 kph and less than or equal to about 35 kph;

the third predetermined length of time is about 0.5 seconds and the third predetermined vehicle speed range includes speed values that are both greater than or equal to about 36 kph and less than or equal to about 55 kph; and the fourth predetermined length of time is about 0.2 seconds and fourth predetermined vehicle speed range includes speed values that are greater than or equal to about 56 kph;

wherein the first predetermined steering wheel angular velocity range is steering wheel angular velocity values that are less than or equal to about 6 deg/s, the second predetermined steering wheel angular velocity range includes steering wheel angular velocity values that are both greater than or equal to about 7 deg/s and less than or equal to about 70 deg/s, the third predetermined steering wheel angular velocity range includes steering wheel angular velocity values that are greater than or equal to about 71 deg/s, the fourth predetermined steering wheel angular velocity range includes steering wheel angular velocity values that are less than or equal to about 6 deg/s, the fifth predetermined steering wheel angular velocity range includes steering wheel angular velocity values that are both greater than or equal to about 7 deg/s and less than or equal to about 50 deg/s, the sixth predetermined steering wheel angular velocity range includes steering wheel angular velocity values that are greater than or equal to 51 deg/s, the seventh predetermined steering wheel angular velocity range includes steering wheel angular velocity values that are less than or equal to about 6 deg/s, the eighth predetermined steering wheel angular velocity range includes steering wheel angular velocity values that are both greater than or equal to about 7 deg/s and less than or equal to about 30 deg/s, the ninth predetermined steering wheel angular velocity range includes steering wheel angular velocity values that are greater than or equal to about 31 deg/s, the tenth predetermined steering wheel angular velocity range includes steering angle values that are less than or equal to about 10 deg/s, and the eleventh predetermined steering wheel angular velocity range includes steering angle values that are greater than or equal to about 11 deg/s.

12. The computer-readable storage medium of claim 8, wherein the output of the steering input sensor is at least one of a steering wheel angular velocity of a steering wheel of the vehicle and a torque applied to the steering wheel of the vehicle;

wherein the steering event occurs when the steering wheel angular velocity is greater than or equal to a steering wheel angular velocity steering event threshold, and the torque applied to the steering wheel of the vehicle is greater than or equal to a steering wheel torque steering event threshold;

wherein determining the driver alert level includes:
calculating a driver alert level value, and comparing the driver alert level value to a predetermined driver alert threshold value;
wherein the driver alert level value is calculated using at least one of a range of the obstacle and the relative velocity of the obstacle;
wherein the driver alert level is low, when the driver alert value exceeds the predetermined alert threshold, and the driver alert level is high, when the driver alert value is less than or equal to the predetermined alert threshold;
wherein the steering wheel angular velocity steering event threshold is 10 deg/s and the steering wheel torque steering event threshold is 1 Nm.

13. The computer-readable storage medium of claim 8, wherein the driver alert device produces at least one of a visual alert device, an audio alert device, and a tactile alert device.

14. The computer readable storage medium of claim 13, wherein the visual alert device is a display having a border and a size, wherein a color of the border is determined by the driver alert level and the size of the display is determined by an intent of a driver to move the vehicle into a lane shown in the display;
wherein the audio alert device has at least one of a speaker for producing an audio alert in the vehicle, the audio alert having a location, a duration, and an intensity, wherein the at least one of the duration, the location, and the intensity of the audio alert varies based on the driver alert level and the location of the obstacle; and
wherein the tactile alert device is a steering wheel vibrator for vibrating the steering wheel of the vehicle.

* * * * *